United States Patent
Lam et al.

(10) Patent No.: US 10,527,712 B2
(45) Date of Patent: Jan. 7, 2020

(54) RAY-SURFACE POSITIONING SYSTEMS AND METHODS

(71) Applicant: TRUSTEES OF BOSTON UNIVERSITY, Boston, MA (US)

(72) Inventors: Emily W. Lam, Cambridge, MA (US); Thomas D. C. Little, Newton, MA (US)

(73) Assignee: TRUSTEES OF BOSTON UNIVERSITY, Boston, MA (US)

( * ) Notice: Subject to any disclaimer, the term of this patent is extended or adjusted under 35 U.S.C. 154(b) by 0 days.

(21) Appl. No.: 16/414,149

(22) Filed: May 16, 2019

(65) Prior Publication Data
US 2019/0353749 A1    Nov. 21, 2019

Related U.S. Application Data

(60) Provisional application No. 62/672,326, filed on May 16, 2018.

(51) Int. Cl.
*G01S 5/16*     (2006.01)
*G01B 11/00*    (2006.01)

(52) U.S. Cl.
CPC .............. *G01S 5/16* (2013.01); *G01B 11/002* (2013.01)

(58) Field of Classification Search
None
See application file for complete search history.

(56) References Cited

U.S. PATENT DOCUMENTS

| | | | | |
|---|---|---|---|---|
| 4,193,689 A | * | 3/1980 | Reymond | F41G 3/225 356/139.03 |
| 4,670,757 A | * | 6/1987 | Munich | G01S 13/003 342/450 |
| 4,910,526 A | * | 3/1990 | Donnangelo | G01S 3/48 342/32 |
| 5,075,694 A | * | 12/1991 | Donnangelo | G01S 3/48 342/32 |
| 5,798,823 A | * | 8/1998 | Kudo | G03F 7/701 355/53 |

(Continued)

OTHER PUBLICATIONS

E. W. Lam, T. D. C. Little, "Resolving Height Uncertainty in Indoor Visible Light Positioning Using a Steerable Laser", 2018 IEEE International Conference on Communications Workshops (Year: 2018).*

(Continued)

*Primary Examiner* — Dominic J Bologna
(74) *Attorney, Agent, or Firm* — Nixon Peabody LLP

(57) ABSTRACT

A positioning system includes a steerable laser configured to emit a laser beam, an optical receiver, one or more processors, and a memory device. The optical receiver is configured to detect the presence of the laser beam on the optical receiver, measure a received signal strength of light emitted by a luminaire, or both. The memory device stores instructions that, when executed by at least one of the one or more processors cause the positioning system to target the laser beam on the optical receiver, and based on a first angle of the laser beam, a second angle of the laser beam, and an isointense curve associated with the optical receiver and the luminaire, estimate three-dimensional position of the optical receiver relative to the steerable laser source.

20 Claims, 11 Drawing Sheets
(3 of 11 Drawing Sheet(s) Filed in Color)

(56) References Cited

U.S. PATENT DOCUMENTS

| | | |
|---|---|---|
| 9,746,370 B2 | 8/2017 | Barnard |
| 2003/0117320 A1* | 6/2003 | Kim .......................... G01S 3/16 342/457 |
| 2007/0103699 A1 | 5/2007 | Kohnen |
| 2009/0248323 A1 | 10/2009 | Turner |
| 2010/0128109 A1 | 5/2010 | Banks |
| 2011/0197679 A1 | 8/2011 | Kono |
| 2013/0026941 A1 | 1/2013 | Ganick |
| 2015/0276399 A1 | 10/2015 | Breuer |
| 2015/0373503 A1 | 12/2015 | Jovicic |
| 2017/0284790 A1 | 10/2017 | Khatuntsev |

OTHER PUBLICATIONS

Lam, E. W. et al.; "Resolving Height Uncertainty in Indoor Visible Light Positioning Using a Steerable Laser"; 2018 IEEE Intl. Conference on Communications Workshops (ICC Workshops); Elec. And Comp. Eng. Dept., Boston Univ., Boston, Mass.(6 pages).

Prince, G. et al.; "Latency Constrained Device Positioning Using a Visible Light Communication Two-Phase Received Signal Strength--Angle of Arrival Algorithm"; Proc. 6th Intl. Conf. on Indoor Positioning and Indoor Navigation, Banff, Alberta, Canada, Oct. 13-16, 2015 (7 pages).

Prince, G.B. et al.; "Two-Phase Framework for Indoor Positioning Systems Using Visible Light"; Proc. IEEE Globecom Conference 20121, Anaheim CA, Dec. 2012 (28 pages).

Zhang, W. et al.; "Asynchronous indoor positioning system based on visible light communications"; Optical Engineering, vol. 53, pp. 53 — 53 — 10, 2014. [Online]. Available: http://dx.doi.org/10.1117/1.0E.53.4.045105 (10 pages).

Zhang, X. et al.; "Theoretical Accuracy Analysis of Indoor Visible Light Communication Positioning System Based on Received Signal Strength Indicator"; J. Lightwave Technol., vol. 32, No. 21, pp. 3578-3584, Nov. 2014. [Online]. Available: http://jlt.osa.org/abstract.cfm?URI=jlt-32/21/3578 (7 pages).

Zheng, Z. et al.; "Accuracy of Ranging Based on DMT Visible Light Communication for Indoor Positioning"; IEEE Photonics Technology Letters, vol. 29, No. 8, pp. 679-682, Apr. 2017 (4 pages).

Kim, H.S. et al.; "An indoor visible light communication positioning system using a rf carrier allocation technique"; Journal of Lightwave Technology, vol. 31, No. 1, pp. 134-144, Jan. 2013 (11 pages).

Aminikashani, M. et al.; "Indoor location estimation with optical-based orthogonal frequency division multiplexing communications"; Optical Engineering, vol. 55, No. 5, p. 056116, 2016, [Online]. Available: http://dx.doi.org/10.1117/1.OE.55.5,0561.16 (13 pages).

Steendam, H. et al.; "Theoretical lower hound for indoor visible light positioning using received signal strength measurements and an aperture-based receiver"; Journal of Lightwave Technology, vol. 35, No. 2, pp. 309-319, Jan. 2017 (11 pages).

Yang, S. H. et al.; "Three-dimensional visible light indoor localization using AOA and RSS with multiple optical receivers"; Journal of Lightwave Technology, 'vol. 32, No. 14, pp. 2480-2485, Jul. 2014 (6 pages).

International Search Report and Written Opinion of International Searching Authority for Application No. PCT/US2019/032580, dated Jul. 29, 2019 (7 pages).

* cited by examiner

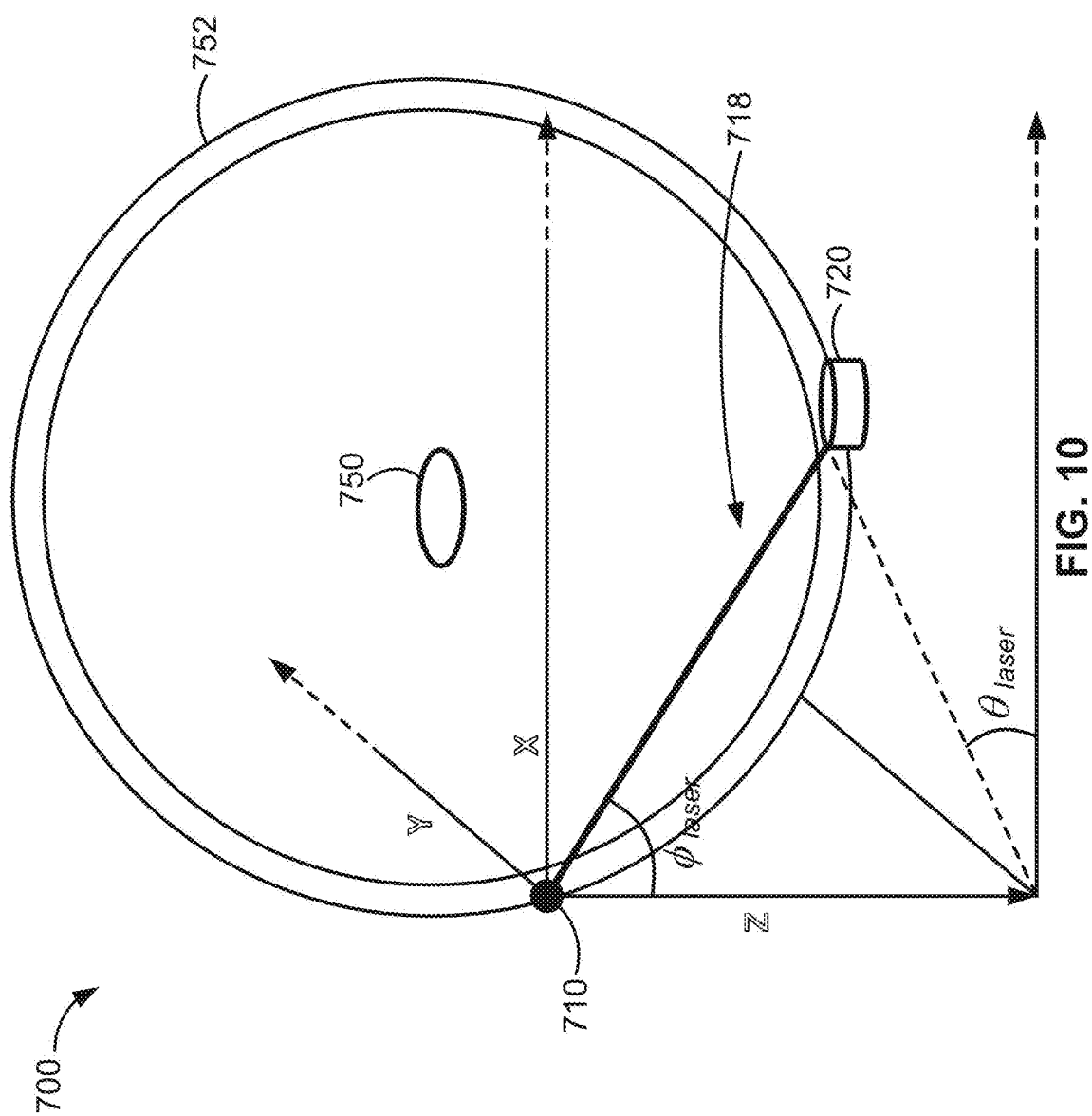

RAY-SURFACE POSITIONING SYSTEMS AND METHODS

CROSS-REFERENCE TO RELATED APPLICATIONS

This application claims the benefit of and priority to U.S. Provisional Patent Application No. 62/672,326, filed on May 16, 2018, which is hereby incorporated by reference herein in its entirety.

STATEMENT REGARDING FEDERAL SPONSORED RESEARCH

This invention was made with Government support under Contract No. EEC-0812056 awarded by the National Science Foundation. The Government has certain rights in the invention.

TECHNICAL FIELD

The present disclosure relates generally to positioning systems and methods, and more particularly, to systems and methods for estimating a position of a receiver relative to a location using a steerable laser.

BACKGROUND

Positioning systems are often used in a variety of applications to determine the position of one or more objects (e.g., in two dimensions or three dimensions) for navigation, tracking, automation, positional advertisements, security, or the like. For example, GPS is often used to determine a position of one or more targets of interest (e.g., a person or object via GPS receivers) in outdoor applications with varying degrees of accuracy. However, use of GPS for determining a position of one or more target objects in an indoor space is not feasible because the GPS signals attenuate/fluctuate due to walls or other obstacles in the indoor space. Many indoor positioning systems require complex and expensive devices (e.g., motion capture systems.) and inexpensive systems may not be sufficiently accurate for the application. There remains a continued need for new systems and methods to accurately and efficiently predict or estimate the position of objects in both indoor and outdoor spaces. The present disclosure addresses these and other problems.

SUMMARY

According to some implementations of the present disclosure, a method for estimating a position of a receiver within a three-dimensional coordinate system includes targeting a laser beam onto the receiver, the laser beam being emitted from an optical source positioned at an origin of the three-dimensional coordinate system, with the laser beam targeted on the receiver, identifying a first angle of the laser beam relative to a first axis of the three-dimensional coordinate system and a second angle of the laser beam relative to a second axis of the three-dimensional coordinate system, based on the first angle of the laser beam, the second angle of the laser beam, and an isointense curve associated with the receiver and a transmitter, determining a predicted received signal strength from the transmitter at a plurality of points along the laser beam, measuring, using the receiver, an actual received signal strength at the receiver associated with a transmission from the transmitter, comparing the predicted received signal strength from the transmitter for the plurality of points along the laser beam with the measured actual received signal strength at the receiver, determining that the predicted received signal strength associated with at least one of the plurality of points along the laser beam corresponds with the measured actual received signal strength at the receiver, and responsive to determining that the predicted received signal strength corresponds with the measured actual received signal strength, determining a first predicted three-dimensional position within the three-dimensional coordinate system of the receiver relative to the optical source.

According to some implementations of the present disclosure, a method for estimating a position of a receiver in an indoor space includes targeting a modulated laser beam onto the receiver, the modulated laser beam being emitted from a steerable laser positioned at an origin of a three-dimensional coordinate system corresponding to the indoor space, responsive to the modulated laser beam being targeted on the receiver, identifying a first angle of the laser beam relative to a first axis of the three-dimensional coordinate system and a second angle of the laser beam relative to a second axis of the three-dimensional coordinate system, transmitting information indicative of the first angle of the modulated laser beam and the second angle of the modulated laser beam from the steerable laser to the receiver, based on the first angle of the modulated laser beam, the second angle of the modulated laser beam, and an isointense curve associated with the receiver and a luminaire positioned at a predetermined location within the three-dimensional coordinate system, determining a predicted received signal strength of light emitted from the luminaire at a plurality of points along the modulated laser beam, measuring, using an optical sensor of the receiver, an actual received signal strength of light emitted from the luminaire at the receiver, comparing the predicted received signal strength of light from the luminaire for at least one of the plurality of points along the modulated laser beam with the measured actual received signal strength of light at the receiver, determining that the predicted received signal strength associated with at least one of the plurality of points along the modulated laser beam corresponds with the measured actual received signal strength at the receiver, and determining a first estimated three-dimensional position of the receiver within the indoor space relative to the steerable laser.

According to some implementations of the present disclosure, an indoor positioning system includes a steerable laser configured to emit a laser beam, a receiver including one or more optical sensors configured to detect the presence of the laser beam on the receiver and measure a received signal strength of light emitted by one or more transmitters, one or more processors, and a memory device storing instructions that, when executed by at least one of the one or more processors cause the indoor positioning system to target, using the steerable laser, the laser beam onto the receiver, determine a predicted received signal strength of light emitted from a first transmitter at a plurality of points along the laser beam based on an identified first angle of the laser beam relative to a first axis of the three-dimensional coordinate system, an identified second angle of the laser beam relative to a second axis of the three-dimensional coordinate system, and a determined isointense curve associated with the receiver and the first transmitter, determine an actual signal strength of light emitted from the first transmitter that is received at the receiver, compare the predicted received signal strength of light for at least one of the plurality of points along the laser beam with the actual received signal strength of light, determine that the predicted received signal strength associated with at least one of the plurality of points along the laser beam corresponds with the actual signal strength received at the receiver, and responsive to determining that the predicted received signal strength corresponds to the actual received signal strength, estimating a three-dimensional position of the receiver relative to the steerable laser.

The above summary is not intended to represent each embodiment or every aspect of the present invention. Additional features and benefits of the present invention are apparent from the detailed description and figures set forth below.

BRIEF DESCRIPTION OF THE DRAWINGS

This application file contains at least one drawing executed in color. Copies of this patent application publication with color drawings will be provided by the Office upon request and payment of the necessary fee.

FIG. 10 is a schematic illustration of a positioning system including a radio-frequency transmitter according to some implementations of the present disclosure.

Figure 1:
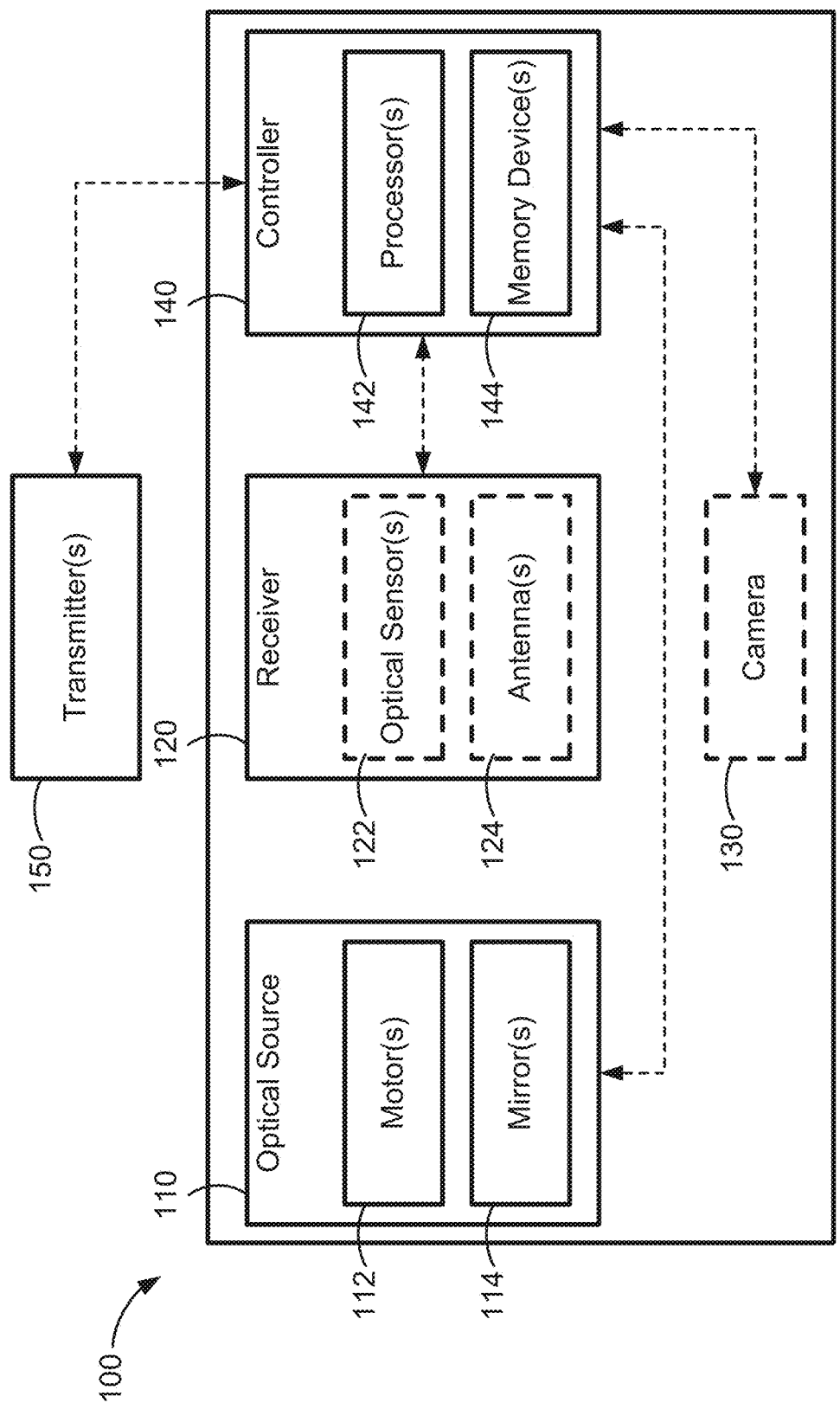
FIG. 1 is a simplified block diagram of a positioning system according to some implementations of the present disclosure.

While the disclosure is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION

While this disclosure is susceptible of embodiment in many different forms, there is shown in the drawings and will herein be described in detail certain aspects of the invention with the understanding that the present disclosure is to be considered as an exemplification of the principles of the invention and is not intended to limit the broad aspect of the invention to the aspects illustrated. For purposes of the present detailed description, the singular includes the plural and vice versa (unless specifically disclaimed); the word "or" shall be both conjunctive and disjunctive; the word "all" means "any and all"; the word "any" means "any and all"; and the words "comprising" and "including" mean "including without limitation." Moreover, words of approximation, such as "about", "almost", "substantially", "approximately", and the like, can be used herein in the sense of "at, near, or nearly at", or "within 3-5 percent of", or "within acceptable engineering tolerances", or any logical combination thereof. Furthermore, the abbreviation, "e.g." is derived from the Latin exempli gratia, and is used herein to indicate a non-limiting example. Thus, the abbreviation "e.g." is synonymous with the term "for example."

Referring to FIG. 1, a simplified block diagram of an exemplary positioning system 100 is illustrated that includes an optical source 110, a receiver 120, an optional camera 130, and a controller 140. The positioning system 100 is used to determine a position of the receiver 120 within a three-dimensional space relative to, for example, the optical source 110 using the methods described herein.

The optical source 110 of the positioning system 100 is configured to emit light (e.g., a laser beam) that can be targeted (e.g., pointed) or focused on a desired location (e.g., the receiver 120) within the three-dimensional space. The optical source 110 can be, for example, a steerable laser, a fixed laser, or other optical signaling device. Generally, the light emitted from the optical source 110 can have a wavelength that is between about 400 nm to about 700 nm (visible light). For example, the optical source 110 can emit a red laser beam having a wavelength that is about 600 nm. Alternatively, or additionally, the laser beam emitted from the optical source 110 can have a wavelength that is greater than about 700 nm (infrared light) such that the laser beam is not visible to the human eye. Given that the positioning system 100 can be used indoors (as described in further detailed herein), in some implementations, an output power of the optical source 110 will be low enough such that it does not pose a risk to human eyes (e.g., less than 5 mW).

The optical source 110 includes one or more actuators 112, one or more mirrors 114, one or more lenses, or any combination thereof. The one or more actuators 112 can be one or more motors, a micro-electromechanical-system (MEMS), a Spatial Light Modulator (SLM), or any combination thereof. The actuators 112 and mirrors 114 aid in precisely and selectively positioning the emitted laser beam on a desired location (e.g., on the receiver 120). As described in further detail below, determining one or more angles of the beam emitted by the optical source 110 relative to a three-dimensional coordinate system (e.g., relative to the x-axis, relative to the y-axis, relative to the z-axis, or any combination thereof) permits the positioning system 100 to determine a three-dimensional position of the receiver 120 relative to the optical source 110.

While the positioning system 100 is described herein as including an optical source 110 that emits light, in some implementations, the positioning system 100 includes a radio-frequency (RF) source that is similar to the optical source 110. In such implementations, the RF source emits a narrow RF beam (signal) that is used in the same or similar manner as the laser beam described herein to estimate a position of the receiver 120. The RF source can steer the RF beam in the same or similar manner as the optical source 110 described herein to target the RF beam onto the receiver 120. Further, in such implementations, the receiver 120 includes a suitable sensor for detecting the RF beam (e.g., an RF antenna or the like). More generally, the positioning system 100 can include any device that can emit a signal that can be focused into a narrow beam in the same or similar manner as the RF source and/or optical source 110 described herein.

In some implementations, the positioning system 100 includes an optional camera 130. As described in further detail below, the optional camera 130 can be used to aid in targeting the laser beam of the optical source 110 onto the receiver 120. For example, the optional camera 130 can be used to track the laser beam emitted from the optical source 110 as the actuators 112 and mirrors 114 cause the laser beam to sweep the room. Using the optional camera 130, the positioning system 100 can determine when the laser beam is targeted on the receiver 120 and either stop further movement of the optical source 110 or store the position of the optical source 110 in a memory device (e.g., using image processing techniques). The optional camera 130 can be configured to capture gray-scale images, color images, still images, video images, or any combination thereof. Further, the optional camera 130 can include zooming ability (e.g., optical and/or digital zoom) to, for example, aid in determining whether the laser beam is targeted on the receiver or finding moving objects 120. The optional camera 130 can detect the full visible light range plus IR range or part of each range.

Alternatively, in other implementations, the laser beam of the optical source 110 can be targeted on the receiver 120 using a variety of other mechanisms or methods. For example, in a beam alignment feedback loop implementation, the optical source 110 sweeps the room and the receiver 120 detects when the laser beam is targeted on the receiver 120 using the same optical sensor (e.g., photodiode) used to detect received signal strength, a different optical sensor (e.g., photodiode), or any combination thereof. Once the receiver 120 detects that the laser beam is targeted on the receiver 120, the optical source 110 narrows the beam down to the location of the receiver 120.

The receiver 120 measures a received signal strength (RSS) of a signal that is emitted from the transmitter 150 and can include an optical sensor 122, a radio-frequency (RF) module 124, or both. As described in further detail below, in some implementations, the transmitter 150 is a luminaire that emits light according to Lambertian model. In such implementations, the receiver 120 includes the optical sensor 122, which is used to measure a received signal strength (RSS) of light emitted from the transmitter 150. The RSS obtained from the optical sensor 122 is a function of the intensity or brightness of the light that is sensed by the optical sensor 122. That is, a brighter or more intense light corresponds to a higher RSS value. The RSS measured by the optical sensor 122 of the receiver 120 is generally a function of the distance between the receiver 120 and the transmitter 150. The optical sensor 122 can also be used to detect the presence of the laser beam emitted from the optical source 110 (e.g., to verify that the optical source 110 is pointed at the receiver 120 and/or to aid in targeting the laser beam of the optical source 110 on the receiver 120). While light emitted according to the Lambertian model is described herein, more generally, a transmitter 150 with any suitable structured light distribution having one or more predetermined properties can be used.

Similarly, in some implementations, the transmitter 150 is a radio-frequency (RF) antenna that emits RF signals in a radial or spherical pattern. In such implementations, the receiver 120 includes the radio-frequency (RF) antenna 124 which is used to measure a received signal strength (RSS) of a radio frequency signal emitted from the transmitter 150. A higher RSS value measured by the RF antenna 124 corresponds to a stronger RF signal. The RSS measured by a received 120 including an RF antenna is generally a function of the distance between the receiver 120 and the transmitter 150.

The positioning system 100 is configured to predict a three-dimensional position (e.g., x, y, and z Cartesian coordinates, polar coordinates, etc.) of the receiver 120 within a three-dimensional space (e.g., an indoor space) using the methods described herein. For example, the receiver 120 can be integrated or incorporated into an object of interest (e.g., a smartphone), permitting the positioning system 100 to determine a position of the object of interest in a three-dimensional space. Alternatively, the receiver 120 can be positioned adjacent to (e.g., directly or indirectly coupled to) an object of interest (e.g., a person, a moving object, a stationary object, etc.) and the positioning system 100 can determine the position of the object of interest using the receiver 120.

As shown in FIG. 1, each of the optical source 110, the receiver 120, and the optional camera 130 are communicatively coupled to the controller 140, which includes one or more processors 142 and a memory device 144. As shown, the controller 140 can be communicatively coupled to one or more of the optical source 110, the receiver 120, or the optional camera 130 using a wired connection, a wireless connection (e.g., an RF connection, a WiFi connection, a Bluetooth connection, optical wireless communications (OWC), Visible Light Communications (VLC) etc.), or any combination thereof. Generally, the controller 140 is used to control the operation of, and receive data from, the optical source 110, the receiver 120, and/or the optional camera 130. While shown as a separate component of the positioning system 100 in FIG. 1, the controller 140 can more generally be incorporated into the positioning system 100 as part of the optical source 110 or the receiver 120. Additionally, or alternatively, the controller 140 can be decentralized and incorporated into an external device (e.g., a server, a computer, a cloud-based system, etc.) In some implementations, the transmitter 150 can also be communicatively coupled to the controller 140 to control operation of the transmitter 150 and/or receive data associated with the transmitter 150 (e.g., receive real-time data related to the signal emitted from the transmitter 150).

While the controller 140 is shown and described herein as being a centralized controller that communicates with the optical source 110 and the receiver 120, in some implementations, each of the optical source 110 and the receiver 120 can include a controller that is the same as, or similar to, the controller 140. In such implementations, the controller of the optical source 110 and the controller of the receiver 120 are configured to communicate with one another (e.g., using radio frequency signals such as WiFi, Bluetooth, cellular, or the like, or using visible light communication such as LiFi or the like) such that the receiver 120 can receive data (e.g., angle information) from the optical source 110, the optical source 100 can receiver data from the receiver 120, or both.

Generally, the transmitter 150 is configured to transmit/emit a signal that is received by the receiver 120. As described in further detail below, the received signal strength (RSS) of the signal emitted from the transmitter 150 received by the receiver 120 aids the positioning system 100 in determining a position of the receiver 120. Exemplary aspects of the transmitter 150 include a lighting luminaire (FIG. 2A) or a radio frequency (RF) antenna (FIG. 10). More generally, the transmitter 150 can be any device that transmits or emits a signal that has predetermined properties, such as, for example, an acoustic signal (in which case the receiver 120 can include a microphone or other sensor for measuring acoustic signals), a magnetic signal (in which case the receiver 120 can include a magnetometer), or any combination thereof.

Figure 2A:
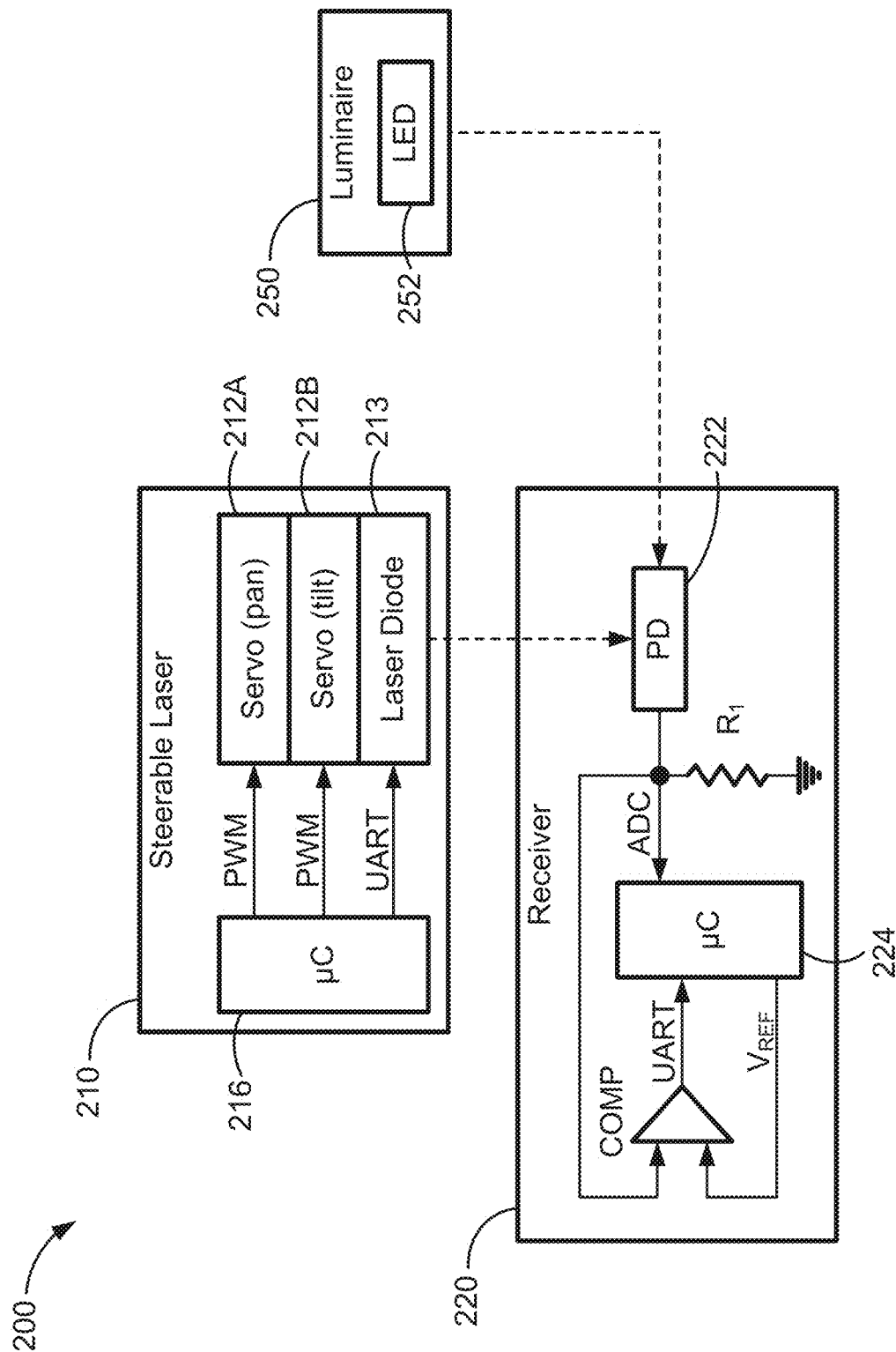
FIG. 2A is a simplified block diagram of a positioning system according to some implementations of the present disclosure.
Figure 2B:
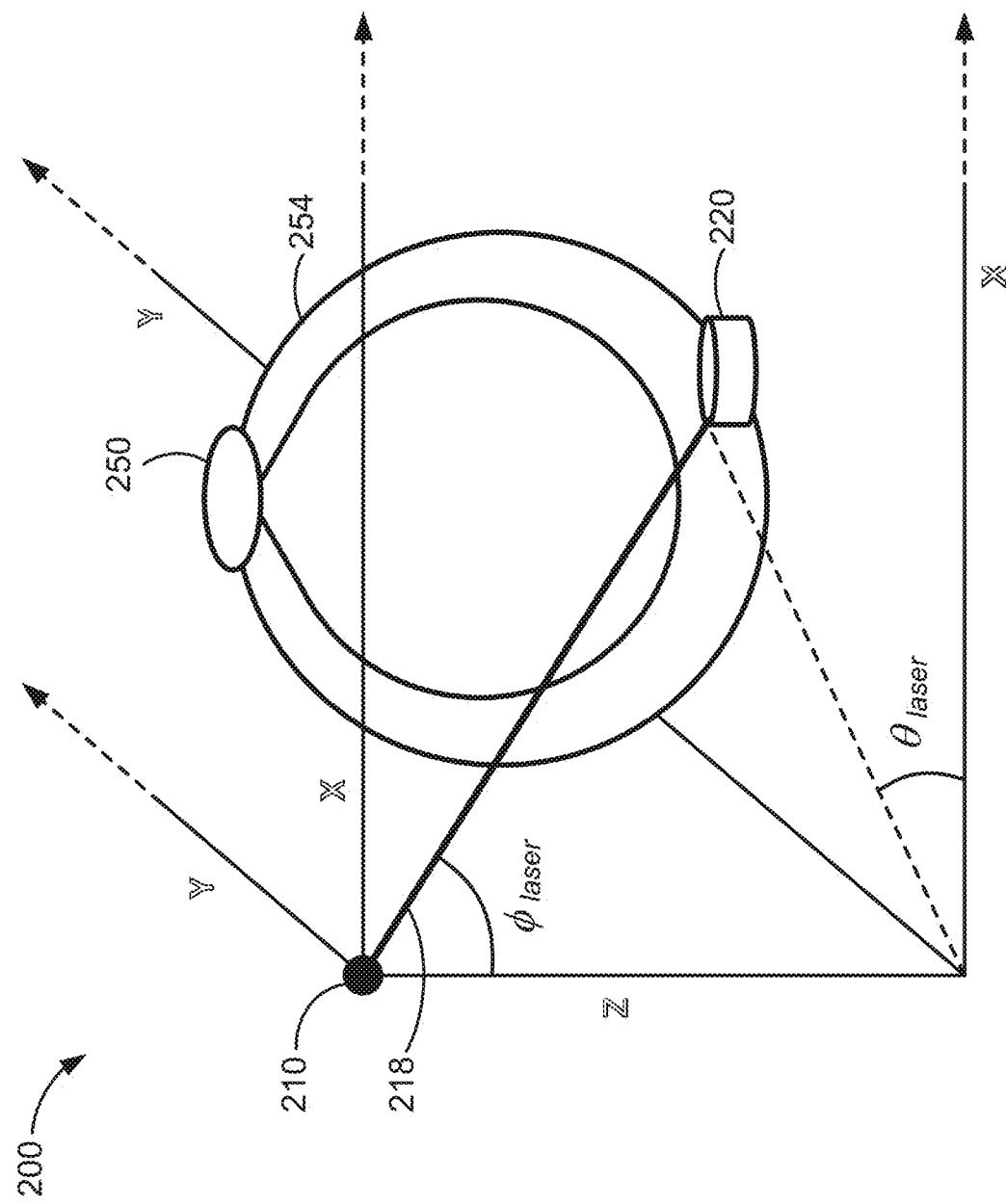
FIG. 2B is a schematic illustration of the positioning system of FIG. 2A according to some implementations of the present disclosure.

Referring generally to FIGS. 2A and 2B, a positioning system 200 that is the same as, or similar to, the positioning system 100 described above (FIG. 1) includes a steerable laser 210, a receiver 220, and a luminaire 250. As shown in FIG. 2B, the positioning system 200 is positioned within an indoor space, at least a portion of which is defined by a three-dimensional coordinate system that includes an x-axis, a y-axis, and a z-axis. Like the positioning system 100 described above, the positioning system 200 is used to predict a position (e.g., x, y, and z Cartesian coordinates) of the receiver 220 within the coordinate system of the indoor space.

Referring to FIG. 2A, the steerable laser 210 of the positioning system 200 is similar to the optical source 110 (FIG. 1) of the positioning system 100 described above and includes a first servo motor 212A, a second servo motor 212B, a laser diode 213, and a microcontroller 216. The laser diode 213 is used to emit a modulated laser beam 218 (FIG. 2B) from the steerable laser 210 having a predetermined beam width. The predetermined beam width of the modulated laser beam 218 (FIG. 2B) can be, for example, between about 0.1 mm and about 2 meters, between about 0.5 mm and about 1 meter, between about 0.75 mm and about 5 mm, or between about 1 mm and 2 mm. In some implementations, the predetermined beam width can be changed dynamically by the steerable laser 210 (e.g., using one or more MEMS devices, one or more lenses, etc.)

The first servo motor 212A and the second servo motor 212B are generally used to steer the modulated laser beam 218 (FIG. 2B) emitted from the laser diode (FIG. 2A) to, for example, target the modulated laser beam 218 onto the receiver 220 as shown in FIG. 2B. The first servo motor 212A is configured to pan (e.g., swivel horizontally) the modulated laser beam 218 and the second servo motor 212B is configured to tilt (e.g., swivel vertically) the modulated laser beam 218. The first servo motor 212A and the second servo motor 212B can be used in conjunction with one or more mirrors that are the same as, or similar to, the mirror(s) 114 of the optical source 110 describe above (FIG. 1). The microcontroller 216 of the steerable laser 210 is generally used to control operation of the first servo motor 212A, the second servo motor 212B, and the laser diode 213. More specifically, the microcontroller 216 can communicate with the first servo motor 212A and the second servo motor 212B via pulse width modulation (PWM). The microcontroller 216 can also communicate with the laser diode 213 via a Universal Asynchronous Receiver/Transmitter (UART). In one exemplary, non-limiting implementation of the steerable laser 210, the first servo motor 212A is a Savox SV1257MG servo, the second servo motor 212B is a Savox SH0264MG servo (available from Savox USA), and the microcontroller 216 is a ESP32 microcontroller manufactured by Espressif Systems of Shanghai, China.

While the steerable laser 210 has been described herein as using the first servo motor 212A and the second servo motor 212B to steer the laser beam 218, in some implementation, the steerable laser 210 includes micro-electrical-mechanical systems (MEMS) for steering the laser beam 218 instead of the servo motors 212A and 212B. MEMS devices generally include one or more micromirrors that can be actuated (e.g., using a voltage input, a thermal input, a magnetic input, etc.) to quickly and precise steer the laser beam 218.

As shown in FIG. 2B, the steerable laser 210 is preferably positioned at an origin of the three-dimensional coordinate system defined by the x-axis, the y-axis, and the z-axis (e.g., the steerable laser 210 is positioned at coordinates (0, 0, 0) within the three-dimensional coordinate system). The steerable laser 210 emits the modulated laser beam 218 that is targeted onto a surface of the receiver 220. More specifically, as shown, when targeted on the receiver 220, the modulated laser beam 218 is orientated at a first angle $\phi_{laser}$ relative to the z-axis of the three-dimensional coordinate system and a second angle $\theta_{laser}$ relative to x-axis of the three-dimensional coordinate system.

The microcontroller 216 of the steerable laser 210 measures or determines the first angle $\phi_{laser}$ and second angle $\theta_{laser}$ of the modulated laser beam 218 and encode information indicative of the first angle $\phi_{laser}$ and second angle $\theta_{laser}$ into the modulated laser beam 218. In such implementations, information indicative of the first angle $\phi_{laser}$ and second angle $\theta_{laser}$ can be transmitted from the steerable laser 210 to the receiver 220 via the modulated laser beam 218. That is, the steerable laser 210 can communicate the angle information to the receiver 220 using optical wireless communications (OWC). The receiver 220 can demodulate the signal to determine the first angle $\phi_{laser}$ and second angle $\theta_{laser}$. The modulated laser beam 218 can use, for example, an on-off-keying (OOK)-based modulation protocol, or any other suitable modulation protocol. Further, the steerable laser 210 can use transistor-transistor-logic (TTL) modulation for the laser beam 218. As described in further detail herein, the receiver 220 can then use information indicative of the angles that is encoded in the modulated laser beam 218 to estimate the position of the receiver 220 within the three-dimensional space.

In some implementations, the steerable laser 210 can use light detecting and ranging (LIDAR) to estimate a distance between the steerable laser 210 and a target (e.g., the receiver 220). In such implementations, estimating a distance between the steerable laser 210 and the receiver 220 using LIDAR can aid in estimating the position of the receiver 220 in the three-dimensional space, as described in further detail herein. Further, in some implementations, the steerable laser 210 can include a spatial light modulator (SLM).

While shown at the origin of the three-dimensional coordinate system (i.e., coordinates 0, 0, 0), more generally, the steerable laser 210 can be positioned at any known location within the three-dimensional coordinate system. Further, while the three-dimensional coordinate system has been shown and described herein as a Cartesian coordinate system, in some implementations, the three-dimensional coordinate system can be a polar coordinate system.

The receiver 220 of the positioning system 200 is similar to the receiver 120 (FIG. 1) of the positioning system 100 described above and includes a photodiode 222 and a microcontroller 224. The photodiode 222 is configured to detect the modulated laser beam 218 (FIG. 2B) emitted from the steerable laser 210 when targeted onto the receiver 220. The photodiode 222 of the receiver 220 is also configured to measure a received signal strength (RSS) of light received from the luminaire 250. As described in further detail below, the received signal strength measured by the photodiode 222 can be used by the microcontroller 224 to predict a position of the receiver 220 within a three-dimensional space.

The receiver 220 can also optionally include an analog-to-digital converter (ADC), a voltage divider, a comparator (COMP), a transimpedance amplifier, or any combination thereof, and use a reference voltage of, for example, 1.1 V (which corresponds to a 0.3 mV resolution). While the receiver 220 is shown and described herein as including a single photodiode 222, in some implementations, the receiver 220 has a plurality of photodiodes (e.g., two photodiodes, five photodiodes, etc.) In one exemplary, non-limiting implementation of the receiver 220, the photodiode 222 is a Osram KOM 2125 photodiode (available from OSRAM Opto Semiconductors GmbH of Regensburg, Germany) and the microcontroller 224 is a ESP32 microcontroller manufactured by Espressif Systems of Shanghai, China.

The luminaire 250 of the positioning system 200 is similar to the transmitter(s) 150 (FIG. 1) of the positioning system 100 and includes an LED 252, which provides illumination. At least a portion of that illumination is represented as 254 in FIG. 2B in the indoor space. The LED 252 emits light according to a Lambertian model with one or more predetermined properties. The luminaire 250 can also include a fixture body that houses the LED 252 and aids in coupling the luminaire 250 a surface (e.g., ceiling) of the indoor space. For example, using the three-dimensional coordinate system in FIG. 2B as a reference, the z-coordinate defining the position of the luminaire 250 is 0. The fixture body of the lighting luminaire 250 can be coupled to surface of the ceiling of the indoor space, or the luminaire 250 can be recessed in a portion of the ceiling. The fixture body of the luminaire 250 can include a translucent cover comprising a translucent material, such as, for example, a glass material, a polymer material, or the like, or any combination thereof. The translucent cover of the luminaire 250 can also include frosting or a texture to aid in diffusing light from the LED 252. In one non-limiting, exemplary implementation, the LED 252 is a CREE XLamp MC-E Color LED including for individual LEDS (red, green, blue, and white) available from Cree, Inc. (USA).

While the luminaire 250 is shown in FIG. 2A as having one LED 252, more generally, the luminaire 250 can have any suitable number of LEDs 252 greater than one (e.g., two LEDs, three LEDs, ten LEDs, one-hundred LEDs, etc.) Further, in some implementations, the luminaire 250 includes one or more lamps rather than LED 252, such as, for example, one or more fluorescent lamps, one or more incandescent lamps, or any combination thereof. More generally, the luminaire 250 can be any device(s) that transmit(s) or emit(s) a measurable optical signal.

Figure 3A:
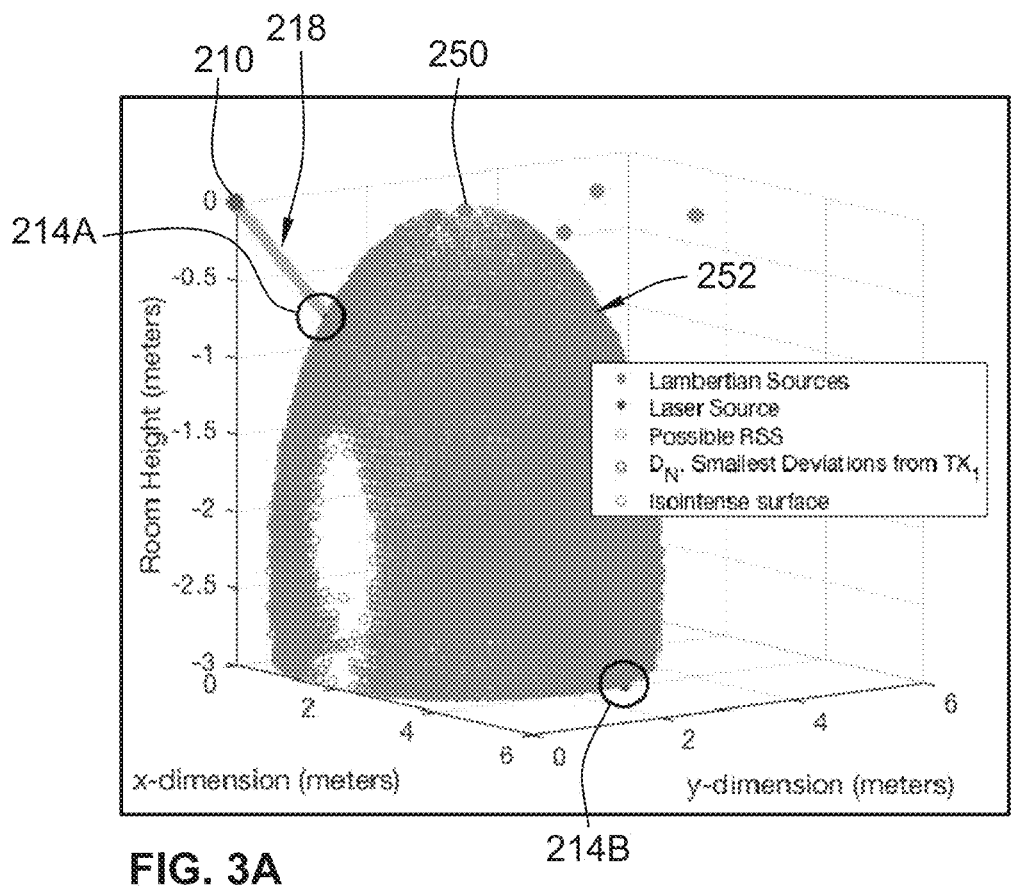
FIG. 3A is an exemplary schematic representation of a laser beam and an isointense curve of a luminaire transmitter according to some implementations of the present disclosure.

Referring now to FIG. 3A, an exemplary schematic representation of a laser beam and an isointense curve of a luminaire is illustrated. The luminaire 250 emits light according to Lambertian model, where the intensity of the light at various distances from the luminaire 250 (e.g., at the receiver 220) is defined by an isointense curve 252. The isointense curve 252 can be calculated based on the characteristics of the luminaire 250 and the receiver 220. Equation 1 below defines a Lambertian model for determining the received signal strength of light from the luminaire 250 at a given position:

$$H_{LOS}^{DC} = \begin{cases} \frac{m+1}{2\pi} \cos\phi \frac{A}{d^2} T_S(\psi) g(\psi) \cos\psi, & 0 \leq \psi \leq \Psi_c \\ 0, & \psi > \Psi_c \end{cases} \quad \text{Equation 1}$$

In equation 1, $\Psi_c$ is the concentrator field of view, A is the detector area, $\phi$ is the angle of incidence (FIG. 4), d is a distance between the luminaire 250 and the receiver 220 (FIG. 4), m is a Lambertian order value, and $T_S(\psi)$ is the signal transmission of the filter (losses over wavelengths). $g(\psi)$ is the concentrator gain and is a function of a refractive index n of the concentrator, and is further defined by equation 2 below:

$$g(\psi) = \begin{cases} \frac{n^2}{\sin^2 \psi_c}, & 0 \leq \psi \leq \Psi_c \\ 0, & \psi > \Psi_c \end{cases} \quad \text{Equation 2}$$

Collecting terms, Lambertian radiant intensity ($R_0(\phi)$) is defined by equation 3 below:

$$R_0(\phi) = \frac{m+1}{2\pi} \cos^2\phi \quad \text{Equation 3}$$

Figure 4:
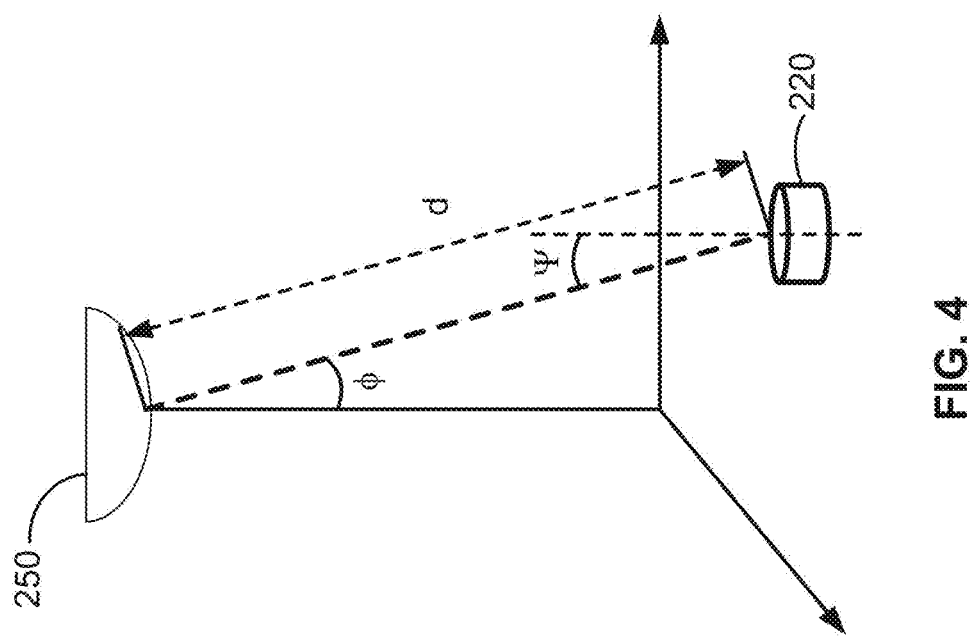
FIG. 4 is a schematic illustration of a transmitter and a receiver of the positioning system of FIG. 2 according to some implementations of the present disclosure.

Further simplifying, the concentrator gain $g(\psi)$ and the signal transmission of the filter $T_S(\psi)$ can be combined into one equation, which is defined as the effective responsivity of the photodiode $R_{eff}(\psi)$ in equation 4 below. In addition, as shown in FIG. 4, when the luminaire 250 is parallel to the transmitting plane and the receiver 220 is parallel to the receiving plane, the angles $\psi$ and $\phi$ are equal, further simplifying the equation.

$$H_{LOS}^{DC} = \begin{cases} R_0(\psi) \frac{A}{d^2} R_{eff}(\psi) * \cos\psi, & 0 \leq \psi \leq \Psi_c \\ 0, & \psi > \Psi_c \end{cases} \quad \text{Equation 4}$$

Finally, to determine the received signal strength (RSS) from the luminaire 250 at any position (e.g., at the receiver 220), noise is modeled as white Gaussian noise (AWGN) and noted by $\omega$ in equation 5 below.

$$P_r = P_t H_{LOS}^{DC} + \omega \quad \text{Equation 5}$$

In equation 5, $P_r$ is the power received at the location, $P_t$ is the transmitter power (i.e., power of the luminaire 250), and $H_{LOS}^{DC}$ is the Lambertian model defined by equation 4 above. As set forth below, equation 5 (or at least a portion of equation 5) can be used to predict a position of the receiver 220 based on the received signal strength of light from the luminaire 250 at the receiver 220.

Figure 5:
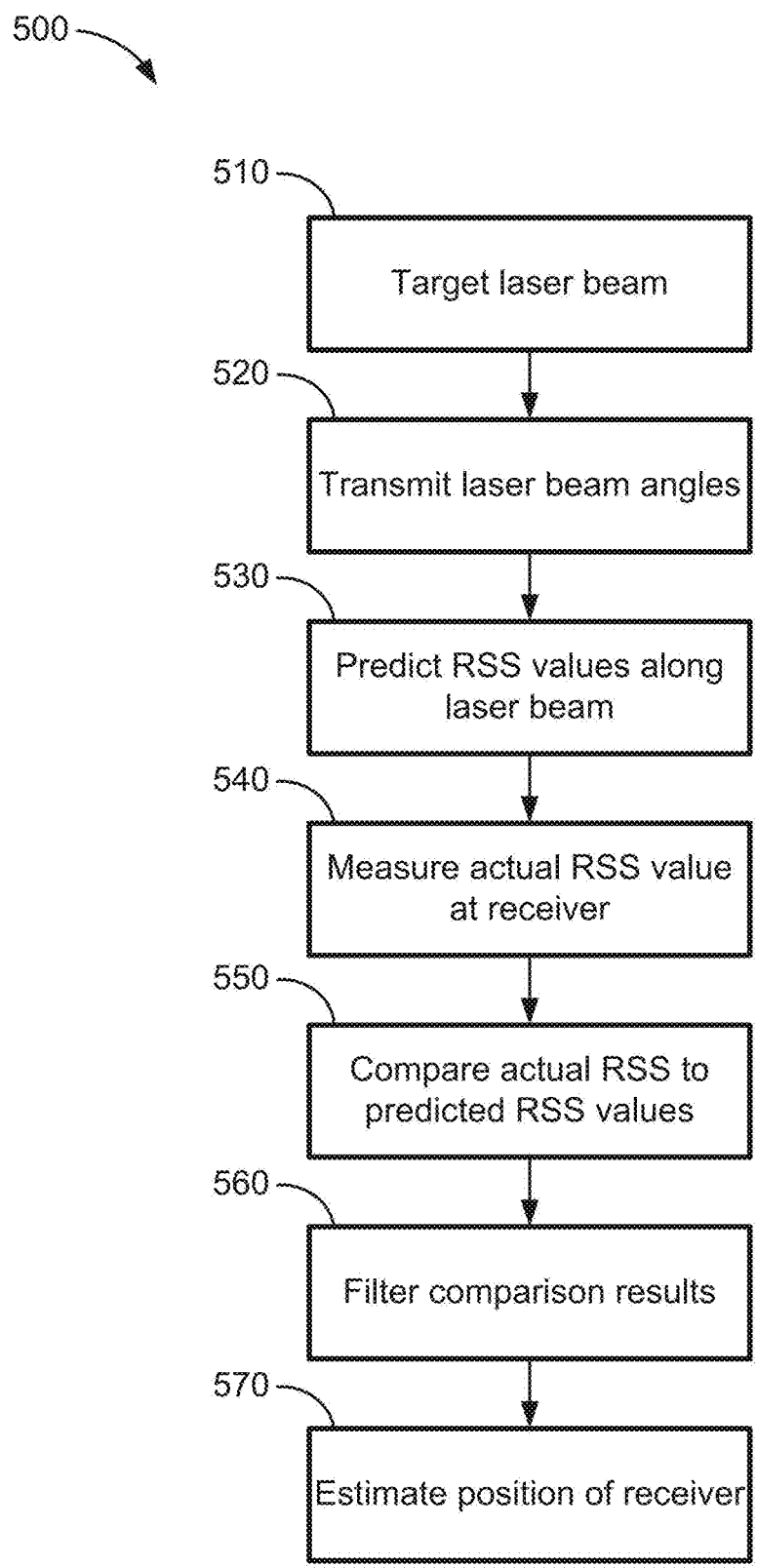
FIG. 5 is a flow diagram of a method of predicting a position of the receiver of the positioning system of FIG. 2, according to some implementations of the present disclosure.

Referring to FIG. 5, a method 500 for predicting a three-dimensional position of the receiver 220 relative to the steerable laser 210 includes a first step 510, a second step 520, a third step 530, a fourth step 540, a fifth step 550, a sixth step 560, and a seventh step 570.

The first step 510 includes targeting the modulated laser beam 218 of the steerable laser 210 onto the receiver 220 as shown in FIG. 2B. The modulated laser beam 218 of the steerable laser 210 can be targeted or pointed on the receiver 220 during the first step 510 in a variety of ways. For example, a user may manually control the steerable laser 210 such that the modulated laser beam 218 is directed onto the receiver 220.

In some implementations, the positioning system 200 includes a camera that is the same, or similar to, the optional camera 130 (FIG. 1) described above. In such implementations, the optional camera 130 is orientated such that the receiver 220 is positioned within the field of view of the optional camera 130. As the steerable laser 210 automatically sweeps the indoor space (e.g., using first servo motor 212A, the second servo motor 212B, and/or mirrors), the optional camera 130 can detect whether the modulated laser beam 218 is positioned on the receiver 220 (e.g., using filters or other image processing techniques).

In other implementations, the steerable laser 210 sweeps the indoor space and the optical sensor of the receiver 220 determines when the modulated laser beam 218 is positioned on the receiver 220. In such implementations, width of the laser beam 218 can be dynamically changed during the targeting step using, for example, one or more lenses, a MEMs device, or the like. Specifically, during the sweeping of the indoor space, the width of the laser beam 218 can be increased (e.g., up to 1 meters, up to 2 meters, etc.) to aid in targeting the laser beam 218 onto the receiver 220. Once the laser beam 212 is generally targeted on the receiver 220, the width of the laser beam 218 can be decreased (e.g., down to 1 mm, 2 mm, 5 mm, etc.) Generally, a wider beam width aids in targeting the laser beam 218 onto the receiver 220, but may lead to less accurate results when estimating the position of the receiver 220 compared to a narrower beam. Conversely, while a narrower beam width may lead to more accurate positioning results, it may be more difficult to target the narrower beam onto the receiver 220 compared to a wider beam width.

The first step 510 can also include validating that the modulated laser beam 218 is positioned on the receiver 220 by determining whether the optical sensor of the receiver 220 detects the presence of the modulated laser beam 218.

The second step 520 includes identifying, determining, transmitting, and/or receiving information indicative of the first angle $\phi_{laser}$ relative to the z-axis of the three-dimensional coordinate system (FIG. 2B) and the second angle $\theta_{laser}$ relative to the x-axis (FIG. 2B) after the modulated laser beam 218 of the steerable laser 210 has been targeted on the receiver 220 during the first step 510. As described herein, the first angle $\phi_{laser}$ and the second angle $\theta_{laser}$ are used in conjunction with the received signal strength (RSS) from the luminaire 250 at the receiver 220 to estimate a position of the receiver 220 relative to the steerable laser 210. Specifically, in step 502, information indicative of the angles can, for example, be transmitted from the steerable laser 210 to the receiver 220 using wireless communications (e.g., an RF signal, WiFi, Bluetooth, visible light communication (VLC) etc.) or wired communications. In some implementations, the steerable laser 210 and receiver 220 use optical wireless communications to transmit data. As described herein, the steerable laser 210 can measure or determine the first angle $\phi_{laser}$ and the second angle $\theta_{laser}$ and encode information indicative of those angles into the modulated laser beam 218. The receiver 220 can demodulate the information encoded in the laser beam 218 to determine the first angle $\phi_{laser}$ and the second angle $\theta_{laser}$. Alternatively, in some implementations, the receiver 220 can measure or determine the first angle $\phi_{laser}$ and the second angle $\theta_{laser}$ instead of the steerable laser 210.

The third step 530 includes predicting a received signal strength (RSS) from the luminaire 250 at a plurality of points along the modulated laser beam 218 (which is positioned on the receiver 220). To predict the RSS at each position, the modulated laser beam 218 can be modeled as a Gaussian beam with a narrow waist. In other words, using equations 6 and 7 below, the modulated laser beam 218 can be modeled as a ray with a point size waist (diameter).

$$\omega(z) = \omega_0 \sqrt{1 + \left(\frac{z}{z_r}\right)^2} \qquad \text{Equation 6}$$

$$z_r = \frac{\pi \omega_0^2}{\lambda} \qquad \text{Equation 7}$$

In equations 6 and 7, $\omega(z)$ is the beam waist as a function of distance (z), $z_r$ is the Rayleigh Scattering distance, $\lambda$ is the wavelength of the modulated laser beam 218, and $\omega(o)$ is the initial laser beam waist size. While equation 1 indicates that the waist or diameter of the modulated laser beam 218 varies with distance, such variations are negligible in an indoor space application. For example, if the maximum height change in an indoor space is z=3 m and a standard red laser is used with a wavelength that is about 632 nm, and the initial laser beam waist size is about 1.6 mm, the maximum change in beam diameter is about 45 p.m. Because other factors such as noise cause greater variations, the modulated laser beam 218 can be modeled as a ray (e.g., a point-sized diameter) with negligible error.

Each point along the modulated laser beam 218 can be designated by a unique height (e.g., with respect to the z-axis in FIG. 2B) and the first angle $\phi_{laser}$ and the second angle $\theta_{laser}$. Thus, noise can be eliminated from equation 5 and this modified equation can be used to predict the received signal strength at any suitable number of points along the modulated laser beam 218. More specifically, equation 8 below is used to determine the received signal strength at each point along the modulated laser beam 218 as illustrated in exemplary FIGS. 3A and 3B.

$$RSS_{x,y,z} = [RSS(z_1) RSS(z_2) \ldots RSS(z_k)] \qquad \text{Equation 8}$$

In this non-limiting example, equation 8 is confined to the z-axis because for z-axis values, the first angle $\phi_{laser}$ and the second angle $\theta_{laser}$, there is only one unique set of x and y values. From each unique x and y value, d and $\psi$ (FIG. 4) can be determined with respect to the transmitter of interest and this solution is plugged into equation 4 to determine $H_{LOS}^{DC}$, which in turn can be used to calculate the RSS using equation 5 with noise set to zero. Advantageously, predicting RSS values using the method 500 requires low computational requirements and does not require the sophisticated processors and/or software used by other positioning systems and/or methodologies.

The fourth step 540 includes measuring the received signal strength (RSS) at the receiver 220 from the luminaire 250. The fifth step 550 includes comparing the actual received signal strength (RSS) to the predicted RSS value at each point along the modulated laser beam 218. More specifically, the actual received signal strength (RSS) from the receiver 220, $P_r$, is used in equation 9 below where the N (e.g., 10, 20, 50, 100, 1,000, etc.) smallest error deviations are taken.

$$D_{n,i} = \operatorname*{argmin}_{i} |RSS_{x,y,z} - P_r| \qquad \text{Equation 9}$$

In equation 9, argmin refers to the argument correlating to the z-position of the i-th smallest error deviation for i=1, 2, ... N. Using equation 9, a plurality of points along the modulated laser beam 218 may be identified as sufficiently close to the actual received signal strength and thus designated as points or areas of interest for further analysis.

Referring to FIG. 3A, in some aspects, the modulated laser beam 218 intersects the isointense curve 252 at more than one location (e.g., at a first area of interest 214A and a second area of interest 214B). In this example, the first area of interest 214A and the second area of interest 214B include N=50 minimum error positions according to the result of equation 9. The intersection of the modulated laser beam 218 with the isointense curve 252 (e.g., containing the first area of interest 214A) is often closer to the ceiling in the indoor space (closer to the luminaire 250) and can be filtered out based on an assumption that the receiver 220 is not close the ceiling (FIG. 2B). For example, if the receiver 220 is affixed on a person, it is a reasonable assumption in most cases that the person is not near the ceiling in an indoor space. Likewise, if the receiver 220 is affixed to or incorporated into an object, it is often a reasonable assumption that the object is not floating close to the ceiling. Further, as the height of the indoor space increases, the more likely the assumption that the receiver 220 is not closer to the ceiling.

During the sixth step 560, the predicted values in the exemplary first area of interest 214A (i.e., the first point where the modulated laser beam 218 intersects the isointense curve 252) can be filtered out using a median absolute deviation (MAD) outlier algorithm. The MAD algorithm is defined by equation 10 below and a predicted value is defined by equation 11:

$$\text{MAD}=\text{median}(|D_{N,i}-\text{median}(D_N)|) \quad \text{Equation 10}$$

$$V=|D_N-\text{median}(D_N)|<3\text{MAD} \quad \text{Equation 11}$$

In some implementations, the predicted values can be filtered during the sixth step 560 based on a previous, known location of the receiver 220. For example, if it is determined that the receiver 220 is positioned at or near the floor within the three-dimensional space at a first time, this information can be used to filter the results when determining the position of the receiver at a second time (e.g., 1 second after the first time, 5 seconds after the first time, 30 seconds after the first time, etc.) when tracking a moving object, for example. In other implementations, the predicted values can be filtered closest to a mean of the ten (10) smallest dedication points in the same or similar manner as the MAD algorithm technique described above.

Figure 3B:
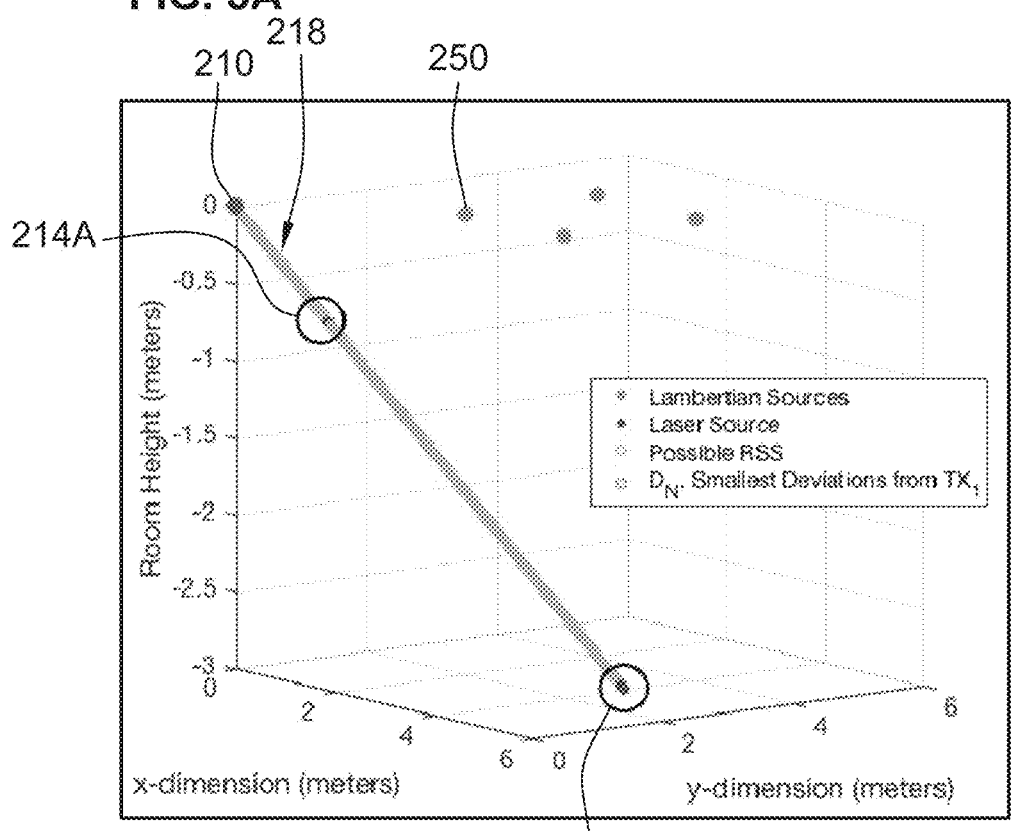
FIG. 3B is an exemplary schematic illustration of the laser beam of FIG. 3A according to some implementations of the present disclosure.

Alternatively, in some implementations, in the sixth step 560 predicted values can be filtered using a second transmitter. The second transmitter can be the same as, or similar to, the luminaire 250 (e.g., the second transmitter is a luminaire) or a different type of transmitter (e.g., an RF transmitter). Steps 510-550 can be repeated in the same or similar manner for the second transmitter. In this exemplary implementation, there will be a total of four intersection clusters (e.g., rather than two, as shown in FIGS. 3A and 3B). Two of these four intersections (intersecting clusters) will be the same, which permits the filtering of results because two of the four intersections are more likely to provide a correct estimation than the other two of the four intersections. The second transmitter can also be used to determine which of the intersection points is the correct intersection point using a course beaconing method or algorithm—where for a plurality of transmitters (e.g., two or more luminaires) using the intersection point that is closest to the transmitter (e.g., luminaire) with the higher signal power (which is not the luminaire 250).

Having filtered out incorrect predicted values, the result of equation 11 is one or more minimum error positions (e.g., N=50). The seventh step 570 includes using these one or more minimum error positions determined in equation 11 to predict the position of the receiver 220 (i.e., the x, y, and z coordinates of the receiver 220 within the three-dimensional coordinate system shown in FIG. 2B) using equations 12-14 listed below.

$$z_{predicted}=\text{mean}(V) \quad \text{Equation 12}$$

$$x_{predicted}=z_{predicted}\tan\phi_{laser}\sin\theta_{laser} \quad \text{Equation 13}$$

$$y_{predicted}=z_{predicted}\tan\phi_{laser}\cos\theta_{laser} \quad \text{Equation 14}$$

While the method 500 has been described above as being used to predict a single position of the receiver 220 (e.g., a single, x, y, and z coordinate, respectively), the method 500 can be repeated one or more times to track positions of the receiver 220 as the receiver 220 moves throughout the three-dimensional coordinate system. By continuously positioning the steerable laser 210 onto the receiver 220 each time the first step 510 is repeated as the receiver 220 moves throughout the three-dimensional space, each of the second step 520 through the seventh step 570 are repeated to continuously track movement of the receiver 220 in real-time. In this manner, the positioning system 200 can be used to track the motion of the receiver 220 and/or determine the velocity and/or acceleration of the receiver 220, for example.

While the positioning system 200 (or more generally positioning system 100) is shown and described herein as including the single receiver 220 (FIG. 2A), more generally, the positioning system 200 can include any suitable number of receivers (e.g., two receivers, three receivers, five receivers, ten receivers, etc.) In such multiple-receiver implementations, the positioning system 200 can be used to predict positions of one or more of the plurality of receivers within the three-dimensional space. In such multiple-receiver implementations, the positioning system 200 can also be used to determine distances between one or more of the plurality of receivers, or to track movement of one receiver relative to a stationary receiver.

While the positioning system 200 is shown and described herein as including the one steerable laser 210 (FIG. 2A), in some implementations, the positioning system 200 includes a plurality of steerable lasers (e.g., two steerable lasers, four steerable lasers, ten steerable lasers, etc.) In such multiple-laser implementations, each of the plurality of steerable lasers can be positioned such that multiple laser beams are positioned on the receiver 220, which can increase the accuracy of the predicted position given that the method 500 can be repeated for each set of angles associated with each of the steerable lasers. Additionally, having a plurality of laser beams that are emitted from a plurality of steerable lasers is advantageous when the path between one of the laser beams and the receiver is obstructed. In this case, the system can reduce to the available, unobstructed laser beams and estimate the position of the receiver. Further, in other implementations, the positioning system 200 can include a plurality of steerable lasers and a plurality of receivers. In such implementations, each of the steerable lasers can be oriented to position a laser beam at different ones of the plurality of receivers, permitting the positioning system 200 to simultaneously determine a predicted position of multiple receivers (e.g., rather than sequentially). In this manner, the positioning system 200 can simultaneously track movement of multiple receivers relative to one or more of the steerable lasers and/or relative to each other.

Further, while the steerable laser 210 of the positioning system 200 has been described herein as being in a fixed, predetermined location within a three-dimensional coordinate system (e.g., on a wall or ceiling of an indoor space) and the receiver 220 of the positioning system 200 has been described herein as being mobile (e.g., placed on or near the floor of the indoor space), in some implementations, the positioning of these components is inverted. In other words, the receiver 220 is fixed at a predetermined location within the three-dimensional coordination system (e.g., on a wall or ceiling of an indoor space) and the steerable laser 210 can be coupled to another object or device that is stationary or moveable (e.g., a robotic arm). In such implementations, the steerable laser 210, the receiver 220, and the transmitter 250 are used in the same or similar manner as described herein to estimate a position of the receiver 220 relative to the steerable laser 210. The receiver 220 can then, for example, transmit that predicted or estimated position to the steerable laser 210 (which in turn can transmit that information to another device to which it is coupled).

Figure 6:
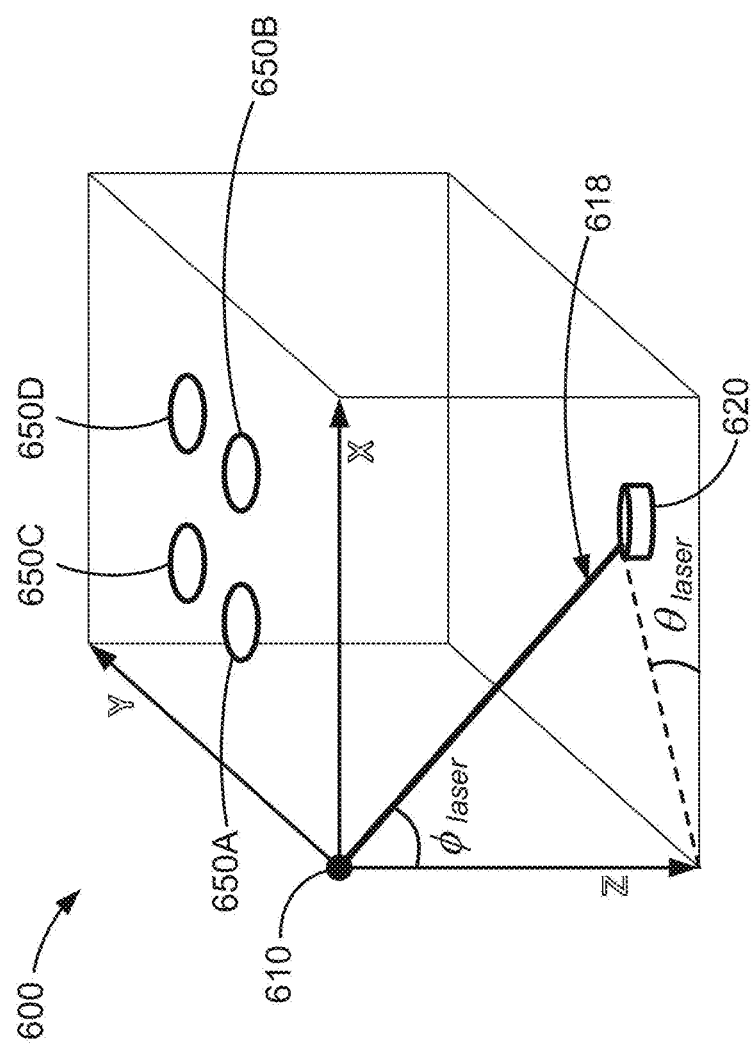
FIG. 6 is a schematic illustration of a positioning system including a plurality of transmitters according to some implementations of the present disclosure.

Referring now to FIG. 6, a positioning system 600 that is similar to the positioning system 200, or more generally positioning system 100, described above is shown. The positioning system 600 is similar to the positioning system 200 in that the positioning system 600 includes a steerable laser 610 and a receiver 620. The steerable laser 610 is the same as, or similar to, the optical source 110 (FIG. 1) and the steerable laser 210 (FIGS. 2A and 2B) described above, and the steerable laser 610 emits a laser beam 618. As shown, the steerable laser 610 is positioned at an origin (i.e., coordinates (0, 0, 0)) of a three-dimensional coordinate system defined by an x-axis, a y-axis, and a z-axis. Similarly, the receiver 620 is the same as, or similar to, the receiver 220 (FIGS. 2A and 2B) described above.

The positioning system 600 differs from the positioning system 200 in that the positioning system 600 includes a plurality of luminaires 650A-650D. Each of the plurality of luminaires 650A-650D are similar to the luminaire 250 described above (FIGS. 2A and 2B) in that each of the plurality of luminaires 650A-650D are configured to emit light according to a Lambertian model. An isointense curve for each of the plurality of luminaires 650A-650D can be calculated using the equations described herein. Each of the plurality of luminaires 650A-650D can be the same type of luminaire (e.g., each emits light such that the isointense curve of each of the plurality of luminaires 650A-650D is identical), or, alternatively, all or some of the plurality of luminaires 650A-650D can be different from one another (e.g., the luminaire 650A can be an LED light whose light emissions are defined by a first isointense curve and the luminaire 650B is an incandescent light whose light emissions are defined by a second isointense curve that is different than the first isointense curve of the luminaire 650A).

A position of the receiver 620 can be predicted by repeating the method 500 (FIG. 5) described above for each of the plurality of luminaires 650A-650D. For example, by using the luminaire 650A and applying the method 500, a first predicted position of the receiver 620 can be obtained. The method 500 is then repeated using the luminaire 650B to obtain a second predicted position of the receiver 620. After repeating the same for the luminaires 650C and 650D, a final predicted position of the receiver 620 can be obtained by, for example, averaging the predicted positions associated with each of one of the plurality of luminaires 650A-650D. In some implementations, the averaging is a weighted average where the predicted position from each luminaire is given a different weight (e.g., more reliable transmitters can be weighed more heavily than others) to produce an even more accurate result. In the case of more than one luminaire (e.g., the plurality of luminaires 650A-650D), each individual luminaire can be used to accurately position the receiver when the receiver is within its "zone," which is defined as the area in which the signal strength from the individual luminaire is greater than the signal strength from the other luminaires. Thus, using multiple luminaires can improve the overall area in which the positioning system can accurately estimate a position of the receiver.

In implementations like system 600 that include a plurality of transmitters (e.g., luminaires), multiplexing can be used to isolate the emitted light from each of the transmitters (e.g., to prevent luminaire signal interference). One example of a multiplexing scheme is time-domain multiplexing (TDM), which is advantageous in that it requires minimal hardware and allocates time slots for each transmitter. Another example is frequency-domain multiplexing (FDM), which requires fewer time slots than TDM to communicate information, but requires additional signal processing to take a signal to and from the time domain. A third example is spatial multiplexing (SM) via imaging where the plurality of transmitters are separated out in space. The SM technique requires additional hardware (e.g., a multi-pixel camera) and more processing power than the TDM and FDM techniques. A fourth example is the wavelength-division multiplexing (WDM) technique, which encodes each light on a separate color.

While the plurality of luminaires 650A-650D of the positioning system 600 is shown as including four luminaires, and the positioning system 200 (FIGS. 2A and 2B) is shown and described as having a single luminaire 250, each of the positioning system 100 and/or the positioning system 600 can more generally include any suitable number of luminaires (e.g., two luminaires, three luminaires, six luminaires, fifteen luminaires, etc.) for a given indoor space. As described in further detail below, in some implementations, increasing the number of luminaires can increase the accuracy by which the positioning system predicts the position of the receiver in three-dimensional space.

The light-based positioning systems 200, 600 described herein are advantageous for a number of reasons. For example, the positioning systems 200 and 600 and the method 500 can utilize existing lighting infrastructure (e.g., the luminaire 250 in an indoor space), meaning that such systems and methods can be implemented at low costs. The positioning systems described herein allow an infinite number of devices to be connected, similar to GPS. These positioning systems also allow a user to opt-in or opt-out of the positioning, thereby adding a layer of privacy preservation. As shown in FIGS. 7A-9 and described in more detail below, the light-based position system 600 described herein can very precisely predict the position of the receiver 620 in an indoor space.

Figure 7A:
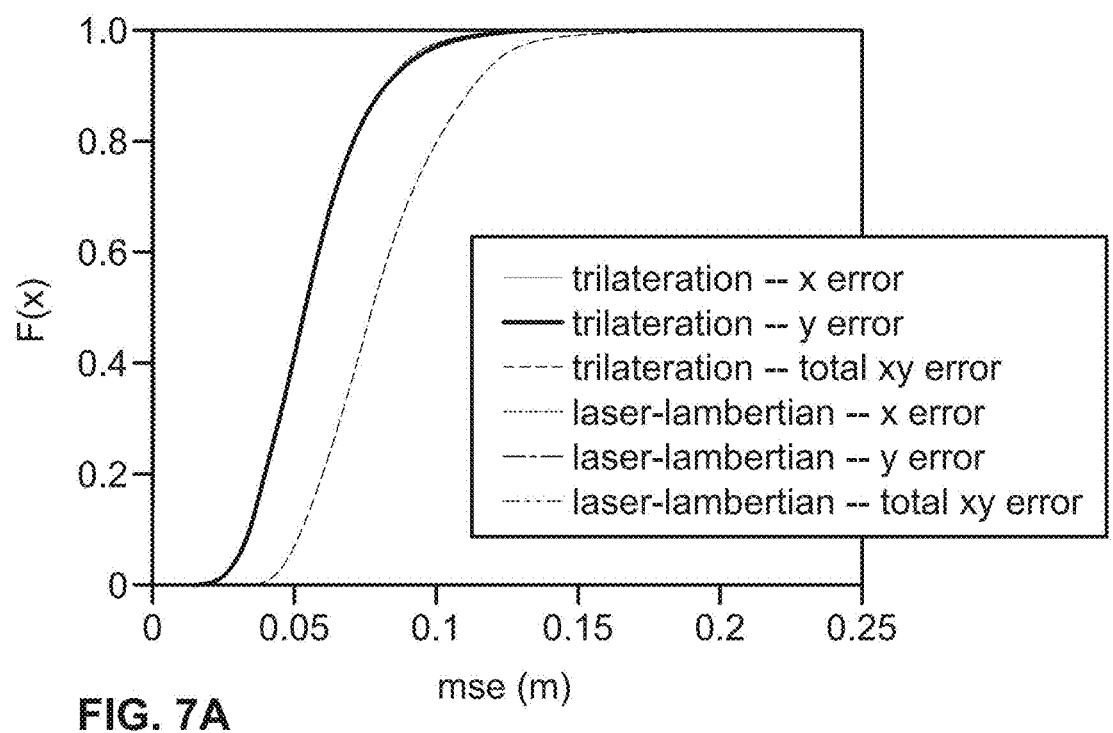
FIG. 7A is an exemplary cumulative distribution function plot illustrating mean square errors based on an exemplary output of the positioning system of FIG. 6 where a height is predetermined according to some implementations of the present disclosure.

Referring to FIG. 7A, an exemplary cumulative distribution function plot illustrating mean square errors for the predicted position of the receiver 620 using the positioning system 600 (FIG. 6) where a height (z-dimension) is predetermined is shown. The plot in FIG. 7A compares the performance of the positioning system 600 against a conventional trilateration approach. As shown, if the height (z-coordinate) is predetermined (fixed), the positioning system 600 perfectly (within steering resolution) predicts the two-dimensional position of the receiver 620. In the exemplary aspect illustrated in FIG. 7A, the trilateration x-error, trilateration y error, laser-lambertian x error, laser-lambertian y error, and laser-lambertian total xy error curves are substantially overlaid on top of one another.

Figure 7B:
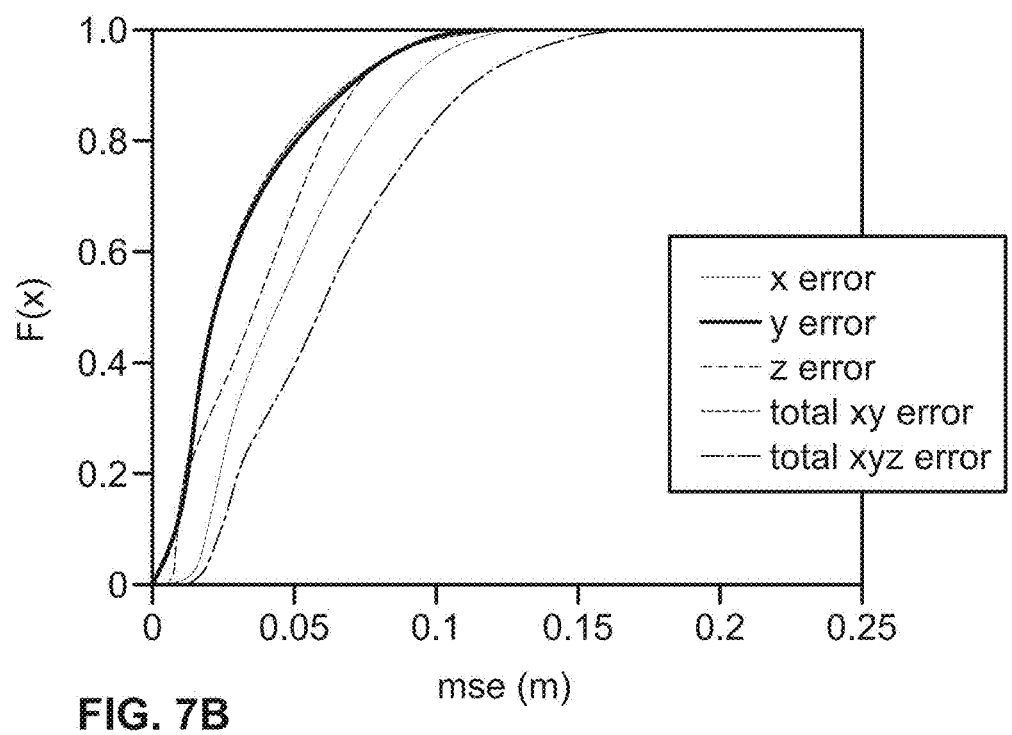
FIG. 7B is an exemplary cumulative distribution function plot illustrating mean square errors based on an exemplary output of the positioning system of FIG. 6 according to some implementations of the present disclosure.

Referring now to FIG. 7B an exemplary cumulative distribution function plot is shown illustrating mean square errors (mse) for predicting the position of the receiver 620 using the positioning system 600 (FIG. 6). Using the exemplary and illustrative (e.g., non-limiting) parameters set forth in the table below, the average positioning mse of 3.14 cm, 3.15 cm, 3.91 cm, 4.96 cm, and 6.45 cm respectively are obtained for x, y, z, xy, and total error. Accuracies of up to 8.37 cm, 8.42 cm, 8.31 cm, 10.15 cm, and 12.89 cm respectively for x, y, z, xy, and total error can be achieved.

| Parameter | Value(s) |
| --- | --- |
| Room Dimensions [L × W × H] | [6 m × 6 m × 3 m] |
| Coordinates of 4 transmitters | (2, 2, 0), (2, 4, 0), (4, 2, 0), (4, 4, 0) |
| Coordinates of laser | (0, 0, 0) |
| Photodiode area | 1 cm² |
| Transmitter Power, $P_t$ | 2 W |
| Field of view, $\Psi_c$ | 70° |
| Optical Filter Gain, $T_s(\psi)$ | 1.5 |
| Signal-to-noise ratio (SNR) | 30 dB |

Figure 8:
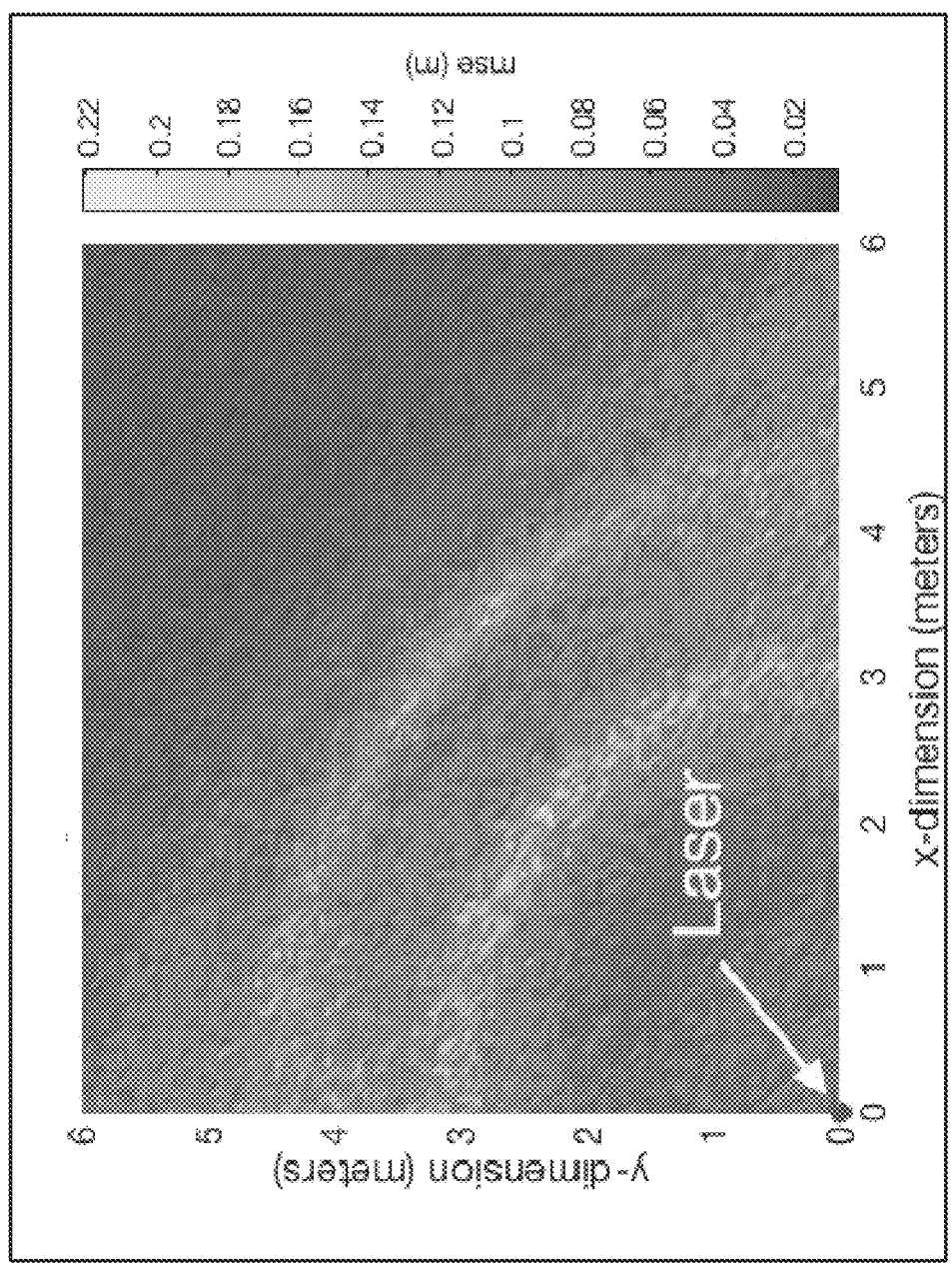
FIG. 8 is an exemplary plot illustrating total mean square errors based on the positioning system of FIG. 6 according to some implementations of the present disclosure.

Referring now to FIG. 8, total three-dimensional mean square error (mse) for each location on a two-dimensional plane is shown where the z-dimension is 3 meters and the laser is positioned at the origin, such as in the top corner of a box-shaped indoor space. FIG. 8 illustrates that relatively larger errors in the predicted position of the receiver 620 using the positioning system 600 (FIG. 6) are more likely to occur when the receiver 620 is positioned closer to the steerable laser 610. Accordingly, in some implementations, the steerable laser 610 (FIG. 6) can be positioned at other locations within the three-dimensional coordinate system (e.g., at a further distance from the plurality of luminaires 650A-650D) to improve the performance of the positioning system 600.

Figure 9:
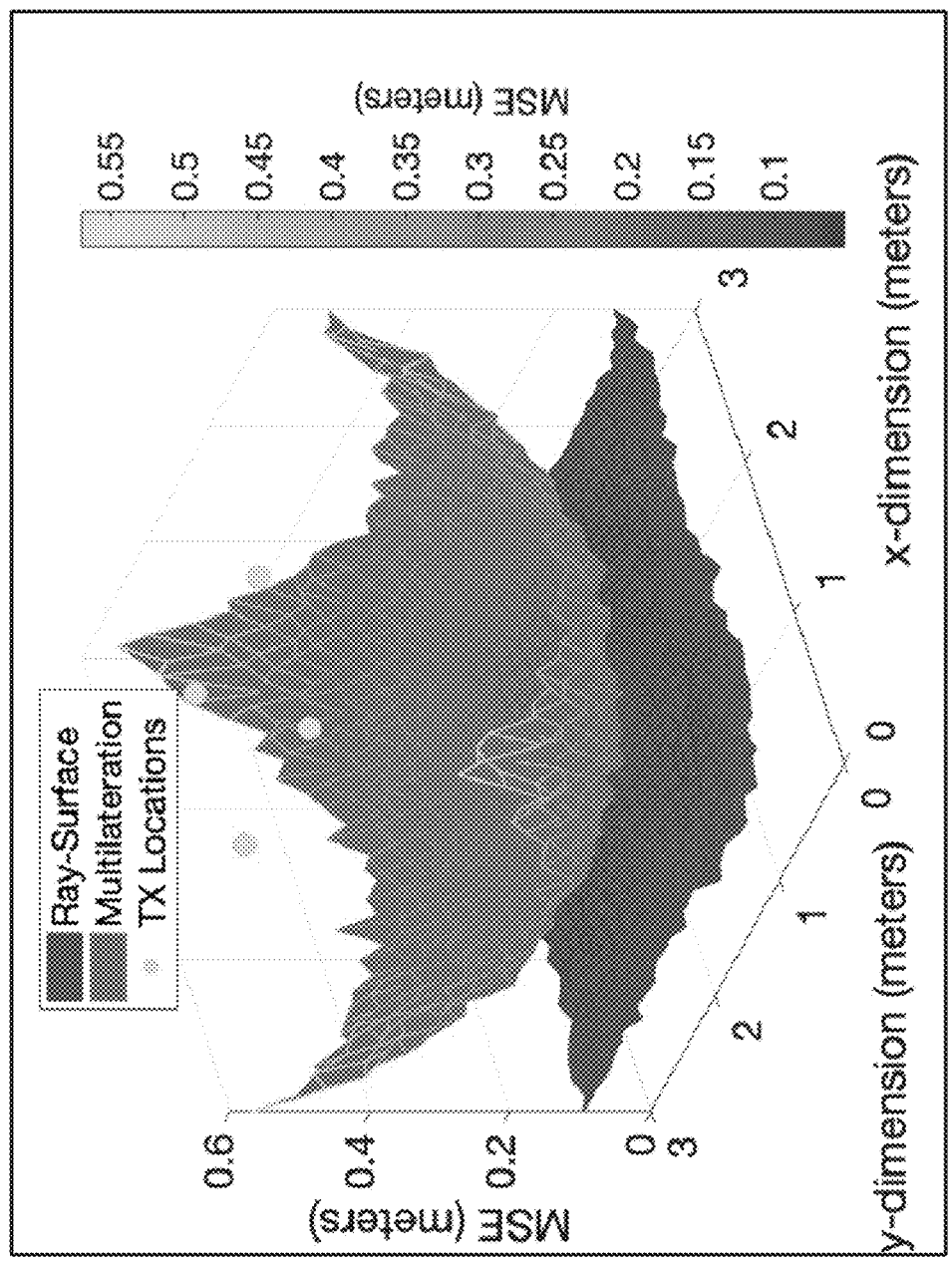
FIG. 9 is an exemplary plot illustrating mean square errors for a plurality of positioning systems having a varying number of luminaire transmitters according to some implementations of the present disclosure.

Referring to FIG. 9, an illustrative (e.g., non-limiting) example is provided of the mean square error (mse) in positioning using a ray-surface positioning system—that is the same as, or similar to, the positioning system 600 (FIG. 6) described herein—compared to conventional multi-lateration (e.g., trilateration) techniques. In FIG. 9, the "TX Locations" refer to the positions or locations of transmitters that are the same as, or similar to the plurality of luminaires 650A-650D of the positioning system 600 shown in FIG. 6. The plot illustrates that using luminaires or transmitters and the methods described herein minimizes error in determining the position of a receiver compared to other techniques. While the ray-surface positioning system need not use more than one transmitter (e.g., luminaire), in some implementations the ray-surface positioning system can use more than one luminaire and use, for example, the strongest signal for improved performance.

Referring now to FIG. 10, a positioning system 700 that is similar to the positioning systems 100, 200 described above is shown. Generally, the positioning system 700 is used to predict a position of a receiver 720 in a three-dimensional space. The positioning system 700 is similar to the positioning system 200 (FIG. 2B) in that the positioning system 700 includes a steerable laser 710 that emits a laser beam 718 and a receiver 720. The steerable laser 710 is the same as, or similar to, the optical source 110 (FIG. 1), the steerable laser 210 (FIG. 2A), and the steerable laser 610 (FIG. 6) described above. As shown, the steerable laser 710 is positioned at an original of a three-dimensional coordinate system defined by an x-axis, a y-axis, and a z-axis (i.e., the steerable laser 710 is positioned at coordinates (0, 0, 0)), such as at or near the top corner of a box-shaped indoor space.

The receiver 720 of the positioning system 700 differs from the receiver 220 of the positioning system 200 (FIG. 2A) in that the receiver 720 includes a radio-frequency (RF) antenna that is the same as, or similar to, the RF antenna 124 of the positioning system 100 (FIG. 1). The radio-frequency antenna of the receiver 220 is configured to measure a received signal strength (RSS) emitted from a radio-frequency (RF) transmitter 750. The transmitter 750 can be, for example, a cellular phone, a radio transmitter, a wireless router, a Bluetooth device, WiFi devices, printers, smart appliances, or the like, or any combination thereof. Unlike the luminaires described above (e.g., the luminaire 250 in FIG. 2A), the RF transmitter 750 does not emit radio-frequency signals according to a Lambertian model. Instead, the RF transmitter 750 emits radio-frequency signals radially as shown in FIG. 10.

While FIG. 10 illustrates a single radio-frequency transmitter 750, it is contemplated that the positioning system 700 can more generally include any suitable number of RF transmitters (e.g., two RF transmitters, three RF transmitters, four RF transmitters, ten RF transmitters, twenty RF transmitters, etc.) Thus, in the same or similar manner as with the positioning system 600 described above, multiple RF transmitters may be used with the positioning system 700 to improve the accuracy of the predicted position of the receiver 720.

Using a method that is the same as, or similar, to the method 500 (FIG. 5), the positioning system 700 can be used to predict a position of the receiver 720 within the three-dimensional coordinate system (e.g., predict x, y, and z coordinates). Like the first step 510 of the method 500, the first step is to position the laser beam 718 onto the receiver 720 as shown in FIG. 10 using the same or similar mechanisms and/or techniques described above. Next, like the second step 520 of the method 500, the first angle $\phi_{laser}$ relative to the z-axis of the three-dimensional coordinate system and the second angle Glaser relative to the x-axis are determined. Then, the first angle $\phi_{laser}$ and the second angle $\theta_{laser}$ are used in conjunction with the received signal strength (RSS) from the RF transmitter 750 at the receiver 720 to determine a position of the receiver 720 relative to the steerable laser 710.

The method for predicting the position of the receiver 720 differs from the method 500 (FIG. 5) described above at the fourth step 540 in that the RF transmitter 750 emits radio frequency signals according to the free-space path loss formula, which is shown as equation 15 below.

$$H, LOS = D_r D_t \left(\frac{\lambda}{4\pi d}\right)^2 \quad \text{Equation 15}$$

In equation 15, $\lambda$ is the signal wavelength, d is the distance between antennas (i.e., the distance between the receiver 720 and the RF transmitter 750), $D_r$ is the receiver antenna directivity, and $D_t$ is the transmitting antenna directivity.

Thus, to predict RSS values from the RF transmitter 750 along the laser beam, equation 15 is used in place of equation 4 described above. Thereafter, the method for predicting the position of the receiver 720 is the same as the method 500 described above in that the method includes measuring the actual RSS value at the receiver 720, comparing the actual RSS value to the predicted RSS values, filtering the comparison results, and finally predicting the position of the receiver 720.

Thus, the positioning system 700 can be used in a similar manner as the positioning system 200, 600 to predict a position of the receiver 720. For similar reasons as the positioning system 200 and 600 described above, the positioning system 700 is advantageous as it can utilize existing infrastructure in an indoor space to predict positions of the receiver and thus can be implemented at a lower cost.

While the positioning systems 100, 300, 700 have been described herein as using a steerable laser that positions a laser beam on a receiver, it is contemplated that in some implementations, rather than using a laser beam, the positioning systems can use a highly beamformed radio frequency beam. Like the laser beam, the radio frequency beam is positioned onto the receiver and the angles of the radio frequency beam when positioned on the receiver can be used to determine the position of the receiver using the same or similar method as those described herein.

The positioning systems and methods described herein offer several technical advantages that overcome drawbacks and limitations of prior positioning system (e.g., GPS systems or camera systems). The drawbacks and limitations of camera-based systems include limitations in low-lighting scenarios, high processing and energy requirements, motion blur, and others. The positioning systems and methods described herein can utilize existing infrastructure such as indoor lighting luminaires and mobile devices with a low-cost optical sensor to estimate the three-dimensional position of an object, meaning that they are relatively low cost. Further, the positioning systems and methods described herein are highly scalable, meaning that they can be used to track multiple target objects at a given time in a wide area with high accuracy (e.g., within about 10 cm for X % of 3D volume in indoor space and within about 1 cm Y % of 3D volume in indoor space) Exemplary applications of the positioning systems and methods described herein include tracking robots or drones (e.g., in a warehouse or factory), tracking users via their mobile devices (which act as a receiver, as described herein), tracking high value equipment, tracking arbitrary objects (e.g., using a reusable puck or other sensors built into devices), augment reality (AR) headsets, data logging, location-based services, telemedicine (e.g., tracking remotely operating medical instruments), performance analytics (e.g., tracking athlete movement in an indoor arena) and next-generation communications.

While the present disclosure has been described with reference to one or more particular embodiments or implementations, those skilled in the art will recognize that many changes may be made thereto without departing from the spirit and scope of the present disclosure. Each of these implementations and obvious variations thereof is contemplated as falling within the spirit and scope of the present disclosure. It is also contemplated that additional implementations according to aspects of the present disclosure may combine any number of features from any of the implementations described herein.

ALTERNATIVE IMPLEMENTATIONS

Implementation 1.

A method for estimating a position of a receiver within a three-dimensional coordinate system includes targeting a laser beam onto the receiver, the laser beam being emitted from an optical source positioned at an origin of the three-dimensional coordinate system, with the laser beam targeted on the receiver, identifying a first angle of the laser beam relative to a first axis of the three-dimensional coordinate system and a second angle of the laser beam relative to a second axis of the three-dimensional coordinate system, based on the first angle of the laser beam, the second angle of the laser beam, and an isointense curve associated with the receiver and a transmitter, determining a predicted received signal strength from the transmitter at a plurality of points along the laser beam, measuring, using the receiver, an actual received signal strength at the receiver associated with a transmission from the transmitter, comparing the predicted received signal strength from the transmitter for the plurality of points along the laser beam with the measured actual received signal strength at the receiver, determining that the predicted received signal strength associated with at least one of the plurality of points along the laser beam corresponds with the measured actual received signal strength at the receiver, and responsive to determining that the predicted received signal strength corresponds with the measured actual received signal strength, determining a first predicted three-dimensional position within the three-dimensional coordinate system of the receiver relative to the optical source.

Implementation 2.

The method according to implementation 1, further comprising prior to determining the predicted received signal strength, transmitting information indicative of the first angle of the laser beam and the second angle of the laser beam from the optical source to the receiver.

Implementation 3.

The method according to implementation 2, wherein the laser beam is modulated and the information indicative of the first angle of the laser beam and the second angle is transmitted to the receiver via the modulated laser beam.

Implementation 4.

The method according to any one of implementations 1-3, wherein the optical source is a steerable laser including (i) one or more actuators, (ii) one or more mirrors, or (iii) both (i) and (ii) configured to aid in targeting the laser beam onto the receiver.

Implementation 5.

The method according to any one of implementations 1-4, further comprising determining that the predicted received signal strength associated with two of the plurality of points along the laser beam corresponds with the measured actual received signal strength, such that two predicted three-dimensional positions of the receiver relative to the optical source are determined, and eliminating one of the two predicted three-dimensional positions using a validation algorithm, thereby obtaining one validated, predicted three-dimensional position within the three-dimensional coordinate system of the receiver relative to the optical source.

Implementation 6.

The method according to implementation 5, wherein the validation algorithm is a median absolute deviation outlier algorithm.

Implementation 7.

The method according to any one of implementations 1-6, wherein the transmitter is a luminaire configured to emit light according to a Lambertian model.

Implementation 8.

The method according to implementation 7, wherein the receiver includes an optical sensor configured to (i) detect the laser beam, (ii) measure a received signal strength of light transmit from the luminaire, or both.

Implementation 9.

The method according to implementation 8, further comprising, detecting, using the receiver, the presence of the laser beam on the receiver to validate the targeting of the laser beam on the receiver.

Implementation 10.

The method according to any one of implementations 1-9, further comprising, validating, using one or more cameras, that the laser beam is targeted on the receiver.

Implementation 11.

The method according to any one of implementations 1-10, wherein the transmitter is a first radio-frequency antenna configured to radially transmit radio signals.

Implementation 12.

The method according to implementation 11, wherein the receiver includes a second radio-frequency antenna configured to determine a signal strength of the radio signals transmitted by the transmitter.

Implementation 13.

The method according to any one of implementations 1-12, further comprising: based on the first angle of the laser beam, the second angle of the laser beam, and an isointense curve associated with the receiver and a second transmitter positioned at a second predetermined location within the three-dimensional coordinate system, determining a second predicted received signal strength from the second transmitter at a plurality of points along the laser beam, measuring, using the receiver, a second actual received signal strength at the receiver associated with a transmission from the second transmitter, comparing the second predicted received signal strength for at least one of the plurality of points along the laser beam with the measured second actual received signal strength, determining that the second predicted received signal strength associated with at least one of the plurality of points along the laser beam corresponds with the second actual received signal strength from the second transmitter, responsive to determining that the second predicted received signal strength corresponds with the second actual received signal strength, determining a second predicted three-dimensional position of the receiver within the three-dimensional coordinate system relative to the optical source, and determining an updated predicted three-dimensional position of the receiver that includes averaging the first predicted three-dimensional position of the receiver and the second predicted three-dimensional position of the receiver.

Implementation 14.

A method for estimating a position of a receiver in an indoor space, the method comprising targeting a modulated laser beam onto the receiver, the modulated laser beam being emitted from a steerable laser positioned at an origin of a three-dimensional coordinate system corresponding to the indoor space, responsive to the modulated laser beam being targeted on the receiver, identifying a first angle of the laser beam relative to a first axis of the three-dimensional coordinate system and a second angle of the laser beam relative to a second axis of the three-dimensional coordinate system, transmitting information indicative of the first angle of the modulated laser beam and the second angle of the modulated laser beam from the steerable laser to the receiver, based on the first angle of the modulated laser beam, the second angle of the modulated laser beam, and an isointense curve associated with the receiver and a luminaire positioned at a predetermined location within the three-dimensional coordinate system, determining a predicted received signal strength of light emitted from the luminaire at a plurality of points along the modulated laser beam, measuring, using an optical sensor of the receiver, an actual received signal strength of light emitted from the luminaire at the receiver, comparing the predicted received signal strength of light from the luminaire for at least one of the plurality of points along the modulated laser beam with the measured actual received signal strength of light at the receiver, determining that the predicted received signal strength associated with at least one of the plurality of points along the modulated laser beam corresponds with the measured actual received signal strength at the receiver, and determining a first estimated three-dimensional position of the receiver within the indoor space relative to the steerable laser.

Implementation 15.

The method according to implementation 14, further comprising determining that the predicted received signal strength associated with two of the plurality of points along the modulated laser beam corresponds with the actual received signal strength, such that two estimated three-dimensional positions of the optical receiver relative to the steerable laser are determined, and eliminating one of the two estimated three-dimensional positions using a validation algorithm, thereby obtaining one validated, estimated three-dimensional position of the optical receiver within the indoor space relative to the steerable laser.

Implementation 16.

The method according to any one of implementations 14 and 15, further comprising, detecting, using the optical sensor of the receiver, the presence of the modulated laser beam on the receiver to validate the targeting of the laser beam on the receiver.

Implementation 17.

The method according to any one of implementations 14-16, further comprising based on the first angle of the modulated laser beam, the second angle of the modulated laser beam, and an isointense curve associated with the receiver and a second luminaire positioned at a second predetermined location within the three-dimensional coordinate system, determining a second predicted received signal strength from the second luminaire at a plurality of points along the laser beam, measuring, using the receiver, an actual received signal strength at the receiver associated with an emission from the second luminaire, comparing the second predicted received signal strength for at least one of the plurality of points along the laser beam with the second actual received signal, responsive to a determination that the second predicted received signal strength associated with at least one of the plurality of points along the laser beam corresponds with the second actual received signal strength from the second luminaire, determining a second estimated three-dimensional position of the receiver within the indoor space relative to the steerable laser, and determining an updated estimated three-dimensional position of the receiver that includes averaging the first estimated three-dimensional position of the receiver and the second estimated three-dimensional position of the receiver.

Implementation 18.

An indoor position system comprising a steerable laser configured to emit a laser beam, a receiver including one or more optical sensors configured to detect the presence of the laser beam on the receiver and measure a received signal strength of light emitted by one or more transmitters, one or more processors, and a memory device storing instructions that, when executed by at least one of the one or more processors cause the indoor positioning system to target, using the steerable laser, the laser beam onto the receiver, determine a predicted received signal strength of light emitted from a first transmitter at a plurality of points along the laser beam based on an identified first angle of the laser beam relative to a first axis of the three-dimensional coordinate system, an identified second angle of the laser beam relative to a second axis of the three-dimensional coordinate system, and a determined isointense curve associated with the receiver and the first transmitter, determine an actual signal strength of light emitted from the first transmitter that is received at the receiver, compare the predicted received signal strength of light for at least one of the plurality of points along the laser beam with the actual received signal strength of light, determine that the predicted received signal strength associated with at least one of the plurality of points along the laser beam corresponds with the actual signal strength received at the receiver, and responsive to determining that the predicted received signal strength corresponds to the actual received signal strength, estimating a three-dimensional position of the receiver relative to the steerable laser.

Implementation 19.

The indoor positioning system according to implementation 18, wherein the first transmitter is a luminaire and the optical sensor of the receiver is a photodiode.

Implementation 20.

The indoor positioning system according to any one of implementations 18 and 19, wherein the steerable laser includes (i) one or more actuators, (ii) one or more mirrors, or both (i) and (ii) that are configured to aid in targeting the laser beam onto the receiver.

Implementation 21.

The indoor positioning system according to any one of implementations 18-20, wherein the laser beam emitted from the steerable laser has a wavelength that is between about 450 nm and about 650 nm and a beam width that is between about 1 mm and about 5 mm.

Implementation 22.

The indoor positioning system according to any one of implementations 18-21, wherein the steerable laser is configured to communicate information indicative of the first angle of the laser beam and the second angle of the laser beam to the receiver using optical wireless communications.

Implementation 23.

The indoor positioning system according to any one of implementations 18-22, wherein the steerable laser is configured to estimate a distance between the steerable laser and the receiver using light detection and ranging (LIDAR).

Implementation 24.

A positioning system comprising a steerable laser configured to emit a laser beam, a receiver configured to detect the presence of the laser beam, measure a received signal strength from a transmitter, or both, a controller including one or more processors and a memory device, the controller being configured to: target, using the steerable laser, the laser beam on the receiver, and based on a first angle of the laser beam, a second angle of the laser beam, and an isointense curve associated with the receiver and the transmitter, determine a predicted three-dimensional position of the receiver relative to the steerable laser.

Implementation 25.

The positioning system according to implementation 24, wherein the transmitter is a luminaire and the receiver includes an optical sensor configured to measure a received signal strength of light from the transmitter.

Implementation 26.

The positioning system according to implementation 25, wherein the optical sensor of the receiver is configured to detect the presence of the laser beam on the receiver to aid in targeting the laser beam on the receiver.

Implementation 27.

The positioning system according to any one of implementations 24-26, wherein the transmitter is a radio-frequency source and the receiver includes a radio-frequency antenna configured to measure a received signal strength from the radio-frequency source.

Implementation 28.

The positioning system according to any one of implementations 24-27, wherein the steerable laser includes one or more motors, one or more mirrors, or any combination thereof.

It is contemplated that any element or any portion thereof from any of implementations 1-28 above can be combined with any other element or elements or portion(s) thereof from any of implementations 1-28 to form an implementation of the present disclosure.

What is claimed is:

1. A method for estimating a position of a receiver within a three-dimensional coordinate system, the method comprising:
    targeting a laser beam onto the receiver, the laser beam being emitted from an optical source positioned at an origin of the three-dimensional coordinate system;
    with the laser beam targeted on the receiver, identifying a first angle of the laser beam relative to a first axis of the three-dimensional coordinate system and a second angle of the laser beam relative to a second axis of the three-dimensional coordinate system;
    based on the first angle of the laser beam, the second angle of the laser beam, and an isointense curve associated with the receiver and a transmitter, determining a predicted received signal strength from the transmitter at a plurality of points along the laser beam;
    measuring, using the receiver, an actual received signal strength at the receiver associated with a transmission from the transmitter;
    comparing the predicted received signal strength from the transmitter for the plurality of points along the laser beam with the measured actual received signal strength at the receiver;
    determining that the predicted received signal strength associated with at least one of the plurality of points along the laser beam corresponds with the measured actual received signal strength at the receiver; and
    responsive to determining that the predicted received signal strength corresponds with the measured actual received signal strength, determining a first predicted three-dimensional position within the three-dimensional coordinate system of the receiver relative to the optical source.

2. The method of claim 1, further comprising prior to determining the first predicted received signal strength, transmitting information indicative of the first angle of the laser beam and the second angle of the laser beam from the optical source to the receiver.

3. The method of claim 2, wherein the laser beam is modulated and the information indicative of the first angle of the laser beam and the second angle is transmitted to the receiver via the modulated laser beam.

4. The method of claim 1, wherein the optical source is a steerable laser including (i) one or more actuators, (ii) one or more mirrors, or (iii) both (i) and (ii) configured to aid in targeting the laser beam onto the receiver.

5. The method of claim 1, further comprising,
determining that the predicted received signal strength associated with two of the plurality of points along the laser beam corresponds with the measured actual received signal strength, such that two predicted three-dimensional positions of the receiver relative to the optical source are determined; and
eliminating one of the two predicted three-dimensional positions using a validation algorithm, thereby obtaining one validated, predicted three-dimensional position within the three-dimensional coordinate system of the receiver relative to the optical source.

6. The method of claim 1, wherein the transmitter is a luminaire configured to emit light according to a Lambertian model.

7. The method of claim 6, wherein the receiver includes an optical sensor configured to detect the laser beam and measure a received signal strength of light transmit from the luminaire.

8. The method of claim 7, further comprising, detecting, using the optical sensor of the receiver, the presence of the laser beam on the receiver to validate the targeting of the laser beam on the receiver.

9. The method of claim 1, wherein the transmitter is a first radio-frequency antenna configured to radially transmit radio signals and the receiver includes a second radio-frequency antenna configured to determine a signal strength of the radio signals transmitted by the transmitter.

10. The method of claim 1, further comprising:
based on the first angle of the laser beam, the second angle of the laser beam, and an isointense curve associated with the receiver and a second transmitter positioned at a second predetermined location within the three-dimensional coordinate system, determining a second predicted received signal strength from the second transmitter at a plurality of points along the laser beam;
measuring, using the receiver, a second actual received signal strength at the receiver associated with a transmission from the second transmitter;
comparing the second predicted received signal strength for at least one of the plurality of points along the laser beam with the measured second actual received signal strength;
determining that the second predicted received signal strength associated with at least one of the plurality of points along the laser beam corresponds with the second actual received signal strength from the second transmitter;
responsive to determining that the second predicted received signal strength corresponds with the second actual received signal strength, determining a second predicted three-dimensional position of the receiver within the three-dimensional coordinate system relative to the optical source; and
determining an updated predicted three-dimensional position of the receiver that includes averaging the first predicted three-dimensional position of the receiver and the second predicted three-dimensional position of the receiver.

11. A method for estimating a position of a receiver in an indoor space, the method comprising:
targeting a modulated laser beam onto the receiver, the modulated laser beam being emitted from a steerable laser positioned at an origin of a three-dimensional coordinate system corresponding to the indoor space;
responsive to the modulated laser beam being targeted on the receiver, identifying a first angle of the laser beam relative to a first axis of the three-dimensional coordinate system and a second angle of the laser beam relative to a second axis of the three-dimensional coordinate system;
transmitting information indicative of the first angle of the modulated laser beam and the second angle of the modulated laser beam from the steerable laser to the receiver;
based on the first angle of the modulated laser beam, the second angle of the modulated laser beam, and an isointense curve associated with the receiver and a luminaire positioned at a predetermined location within the three-dimensional coordinate system, determining a predicted received signal strength of light emitted from the luminaire at a plurality of points along the modulated laser beam;
measuring, using an optical sensor of the receiver, an actual received signal strength of light emitted from the luminaire at the receiver;
comparing the predicted received signal strength of light from the luminaire for at least one of the plurality of points along the modulated laser beam with the measured actual received signal strength of light at the receiver;
determining that the predicted received signal strength associated with at least one of the plurality of points along the modulated laser beam corresponds with the measured actual received signal strength at the receiver; and
determining a first estimated three-dimensional position of the receiver within the indoor space relative to the steerable laser.

12. The method of claim 11, further comprising,
determining that the predicted received signal strength associated with two of the plurality of points along the modulated laser beam corresponds with the actual received signal strength, such that two estimated three-dimensional positions of the optical receiver relative to the steerable laser are determined; and
eliminating one of the two estimated three-dimensional positions using a validation algorithm, thereby obtaining one validated, estimated three-dimensional position of the optical receiver within the indoor space relative to the steerable laser.

13. The method of claim 11, further comprising, detecting, using the optical sensor of the receiver, the presence of the modulated laser beam on the receiver to validate the targeting of the laser beam on the receiver.

14. The method of claim 11, further comprising:
based on the first angle of the modulated laser beam, the second angle of the modulated laser beam, and an isointense curve associated with the receiver and a second luminaire positioned at a second predetermined location within the three-dimensional coordinate system, determining a second predicted received signal strength from the second luminaire at a plurality of points along the laser beam;
measuring, using the receiver, an actual received signal strength at the receiver associated with an emission from the second luminaire;
comparing the second predicted received signal strength for at least one of the plurality of points along the laser beam with the second actual received signal;
responsive to a determination that the second predicted received signal strength associated with at least one of the plurality of points along the laser beam corresponds with the second actual received signal strength from the second luminaire, determining a second estimated three-dimensional position of the receiver within the indoor space relative to the steerable laser; and determining an updated estimated three-dimensional position of the receiver that includes averaging the first estimated three-dimensional position of the receiver and the second estimated three-dimensional position of the receiver.

15. An indoor positioning system comprising:
a steerable laser configured to emit a laser beam;
a receiver including one or more optical sensors configured to detect the presence of the laser beam on the receiver and measure a received signal strength of light emitted by one or more transmitters;
one or more processors; and
a memory device storing instructions that, when executed by at least one of the one or more processors cause the indoor positioning system to,
 target, using the steerable laser, the laser beam onto the receiver;
 determine a predicted received signal strength of light emitted from a first transmitter at a plurality of points along the laser beam based on an identified first angle of the laser beam relative to a first axis of the three-dimensional coordinate system, an identified second angle of the laser beam relative to a second axis of the three-dimensional coordinate system, and a determined isointense curve associated with the receiver and the first transmitter;
 determine an actual signal strength of light emitted from the first transmitter that is received at the receiver;
 compare the predicted received signal strength of light for at least one of the plurality of points along the laser beam with the actual received signal strength of light;
 determine that the predicted received signal strength associated with at least one of the plurality of points along the laser beam corresponds with the actual signal strength received at the receiver; and
 responsive to determining that the predicted received signal strength corresponds to the actual received signal strength, estimating a three-dimensional position of the receiver relative to the steerable laser.

16. The indoor positioning system of claim 15, wherein the first transmitter is a luminaire and the optical sensor of the receiver is a photodiode.

17. The indoor positioning system of claim 15, wherein the steerable laser includes (i) one or more actuators, (ii) one or more mirrors, or both (i) and (ii) that are configured to aid in targeting the laser beam onto the receiver.

18. The indoor positioning system of claim 15, wherein the laser beam emitted from the steerable laser has a wavelength that is between about 450 nm and about 650 nm and a beam width that is between about 1 mm and about 5 mm.

19. The indoor positioning system of claim 15, wherein the steerable laser is configured to communicate information indicative of the first angle of the laser beam and the second angle of the laser beam to the receiver using optical wireless communications.

20. The indoor positioning system of claim 15, wherein the steerable laser is configured to estimate a distance between the steerable laser and the receiver using light detection and ranging (LIDAR).

* * * * *